United States Patent [19]
Sato

[11] Patent Number: 5,734,508
[45] Date of Patent: Mar. 31, 1998

[54] HIGH-MAGNIFICATION WIDE-ANGLE ZOOM LENS

[75] Inventor: Haruo Sato, Saitama-ken, Japan

[73] Assignee: Nikon Corporation, Tokyo, Japan

[21] Appl. No.: 857,085

[22] Filed: May 15, 1997

Related U.S. Application Data

[63] Continuation of Ser. No. 533,957, Sep. 26, 1995, abandoned.

[30] Foreign Application Priority Data

Sep. 26, 1994 [JP] Japan ................ 6-229628

[51] Int. Cl.⁶ .......................................... G02B 15/14
[52] U.S. Cl. ............................ 359/687; 359/684
[58] Field of Search ........................ 359/690, 687, 359/684

[56] References Cited

U.S. PATENT DOCUMENTS

| | | |
|---|---|---|
| 4,477,153 | 10/1984 | Suda et al. |
| 4,484,799 | 11/1984 | Doi et al. |
| 4,494,828 | 1/1985 | Masumoto et al. |
| 4,770,511 | 9/1988 | Yonezawa et al. |
| 4,871,239 | 10/1989 | Masumoto et al. |
| 4,890,904 | 1/1990 | Ito ................ 359/687 |
| 5,032,013 | 7/1991 | Shibayama |
| 5,185,678 | 2/1993 | Arimoto |
| 5,241,420 | 8/1993 | Yamanashi |
| 5,313,331 | 5/1994 | Mihara |
| 5,329,402 | 7/1994 | Sato |
| 5,359,457 | 10/1994 | Saka et al. |
| 5,528,423 | 6/1996 | Arimoto ................ 359/687 |

FOREIGN PATENT DOCUMENTS

| | | |
|---|---|---|
| 57-161824 | 10/1982 | Japan |
| 57-169716 | 10/1982 | Japan |
| 4-149402 | 5/1992 | Japan |

*Primary Examiner*—David C. Nelms
*Assistant Examiner*—John P. Cornely
*Attorney, Agent, or Firm*—Klarquist Sparkman Campbell Leigh & Whinston, LLP

[57] ABSTRACT

A compact, very-wide angle, high zoom-ratio zoom lens suitable for high-performance imaging use with a motion picture or still camera is disclosed. The zoom lens provides an image of an object over a continuous range of magnification from a wide-angle mode to a telephoto mode. The zoom lens comprises, coaxially objectwise to imagewise, a first lens group having positive refractive power, a second lens group having negative refractive power, and a third lens group having positive refractive power. Each lens group is axially movable for zooming, and the second lens group is also axially movable for focusing. Each lens group preferably includes multiple lens elements, wherein each of the second and third lens groups preferably includes an aspheric lens element. The lens elements in the third lens group are disposed in a front and a rear lens group both having positive refracting power and both being independently axially movable for zooming. The lens exhibits a zooming ratio of at least 5-fold and a maximal field angle in the wide-angle mode of at least 80°. An aperture stop is preferably disposed objectwise of the third lens group. The zoom lens preferably satisfies one or more specific performance conditions.

29 Claims, 21 Drawing Sheets

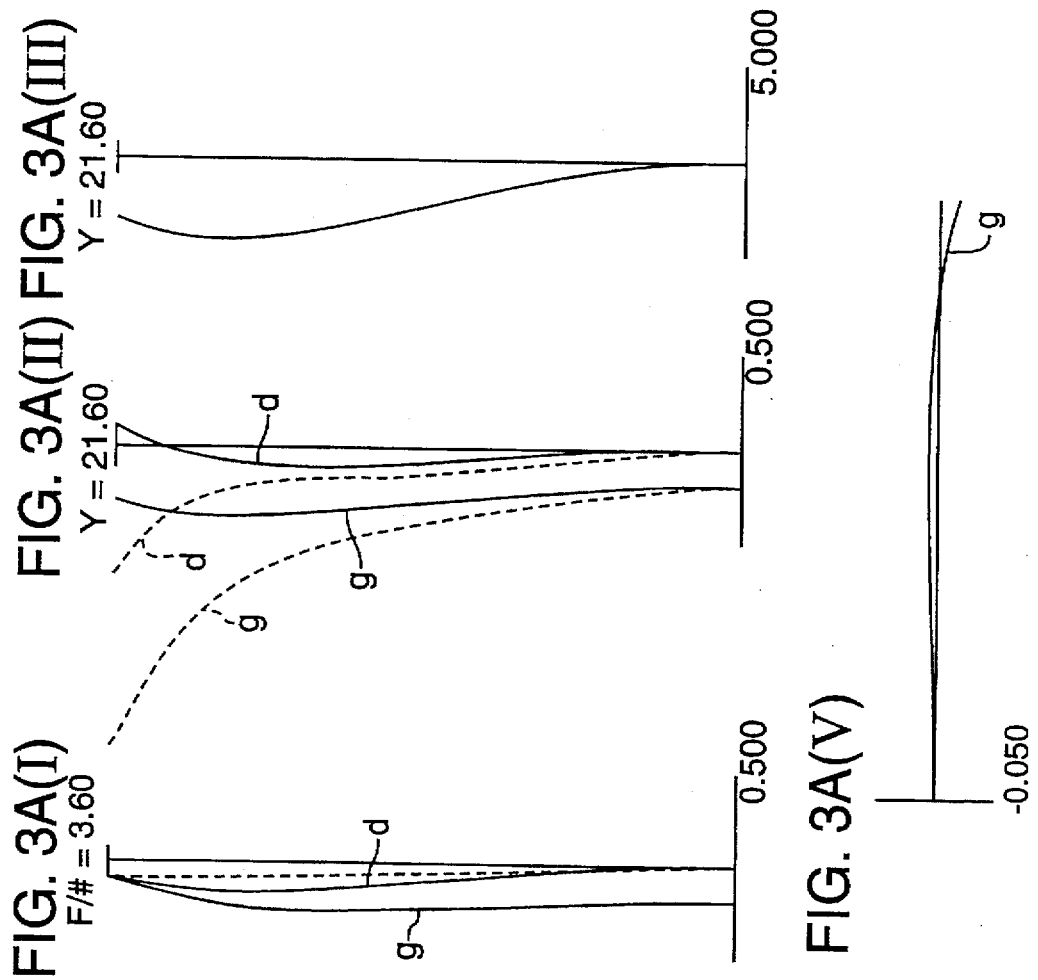
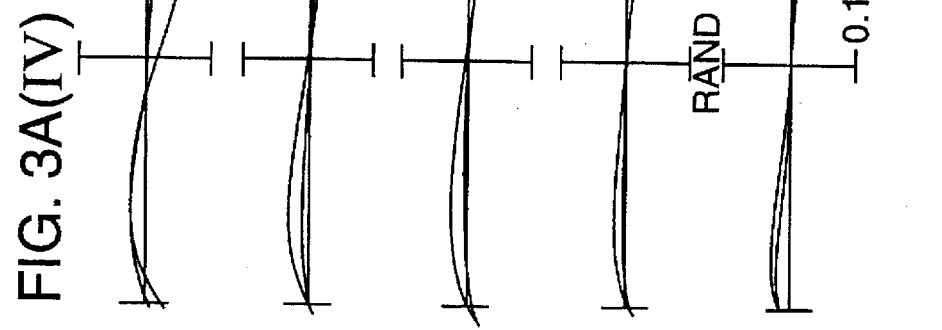

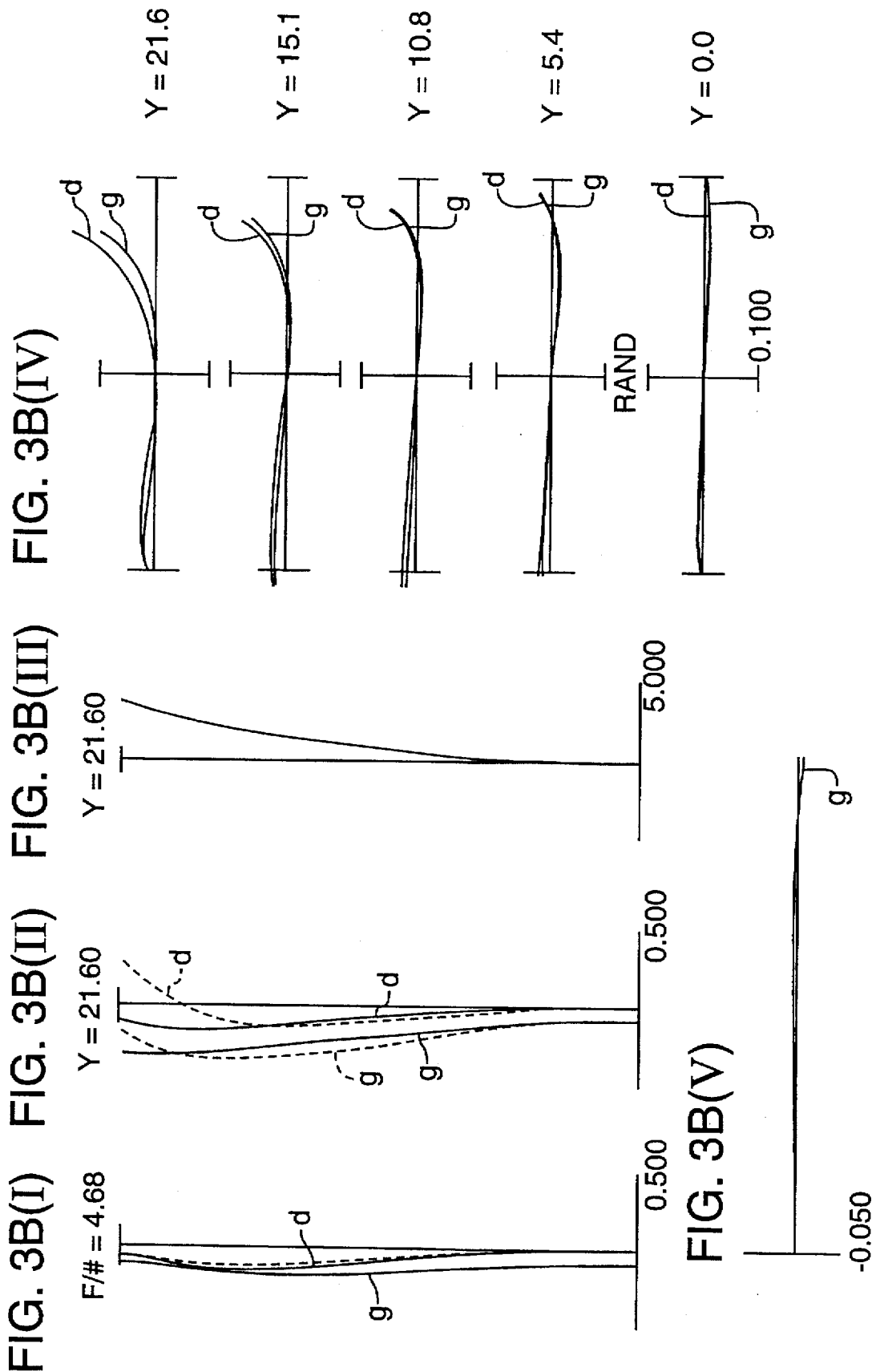

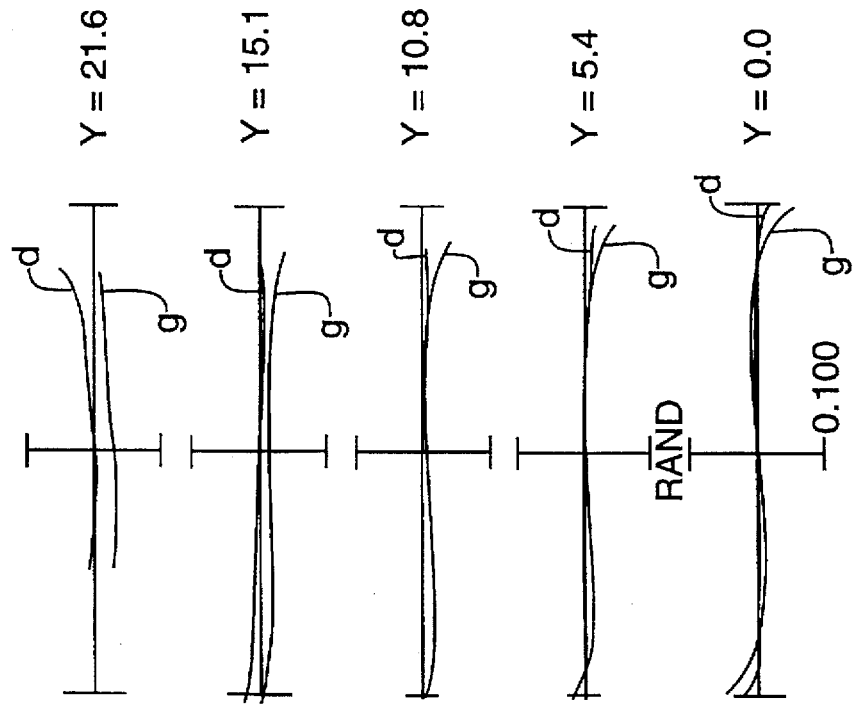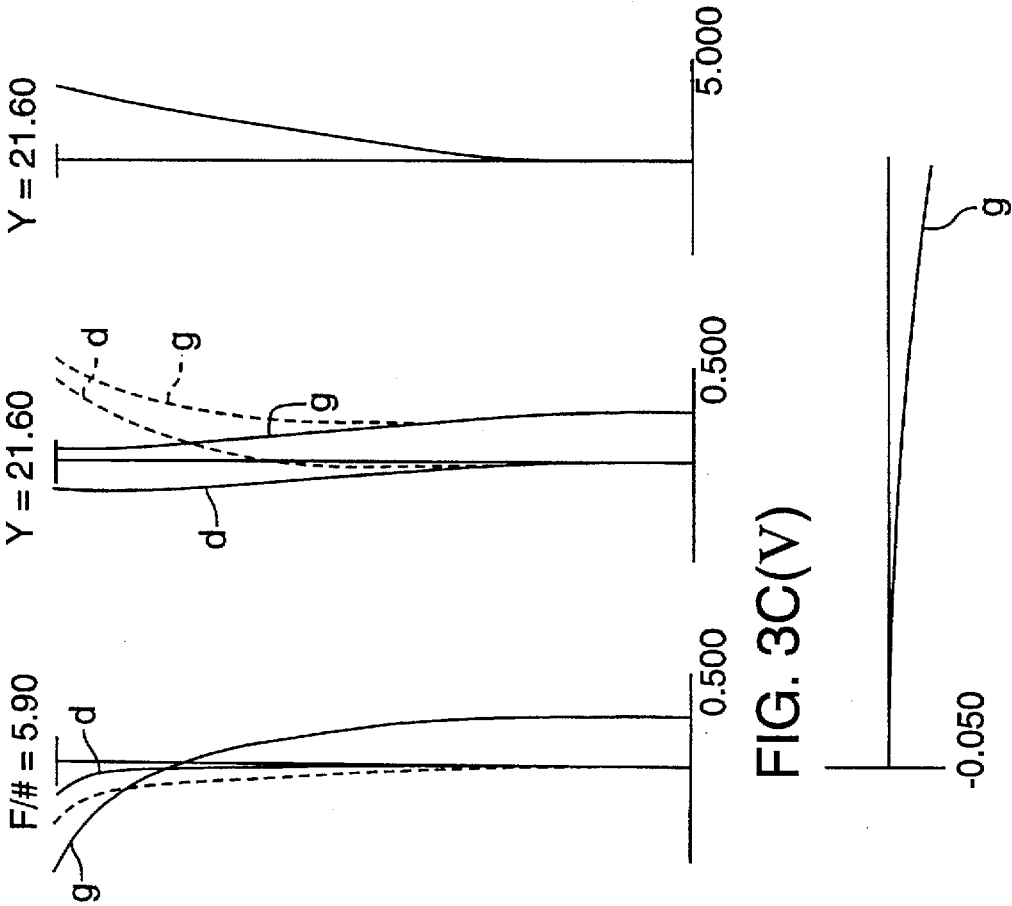

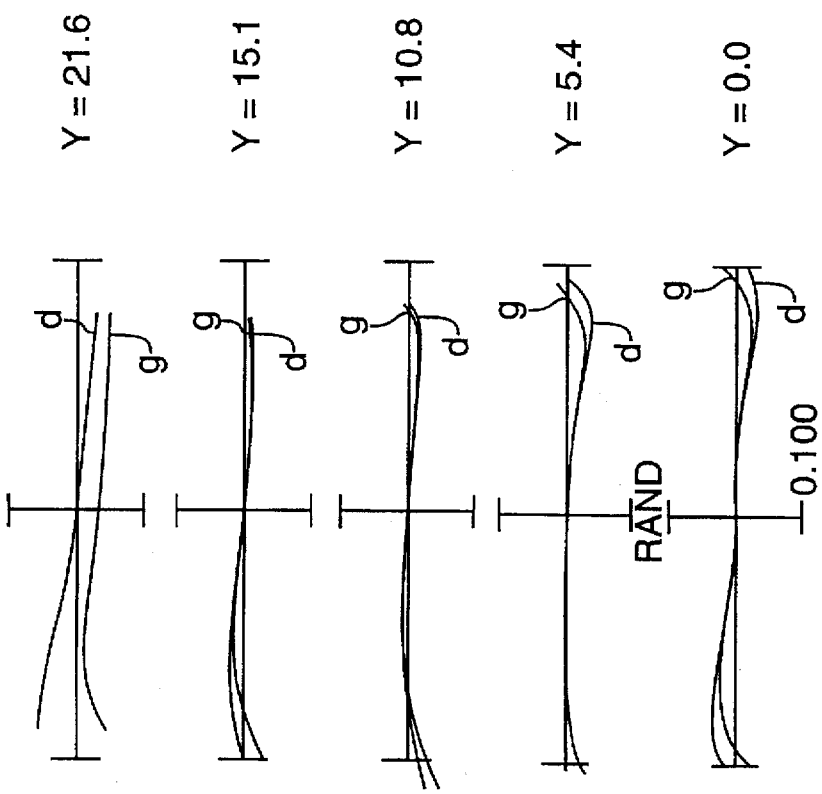
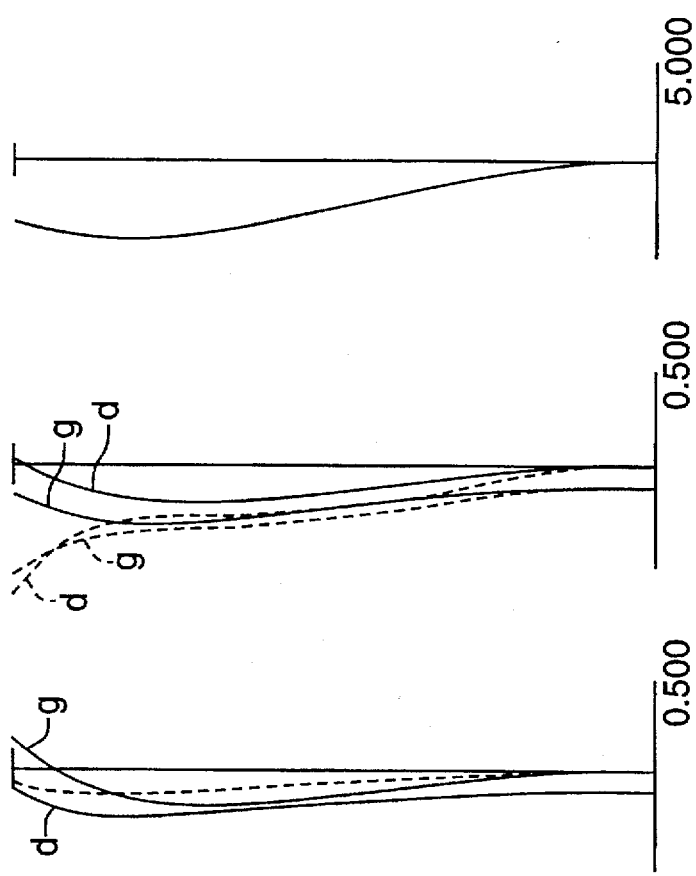
FIG. 5A(I) F/# = 3.62
FIG. 5A(II) Y = 21.60
FIG. 5A(III) Y = 21.60
FIG. 5A(IV)
FIG. 5A(V)

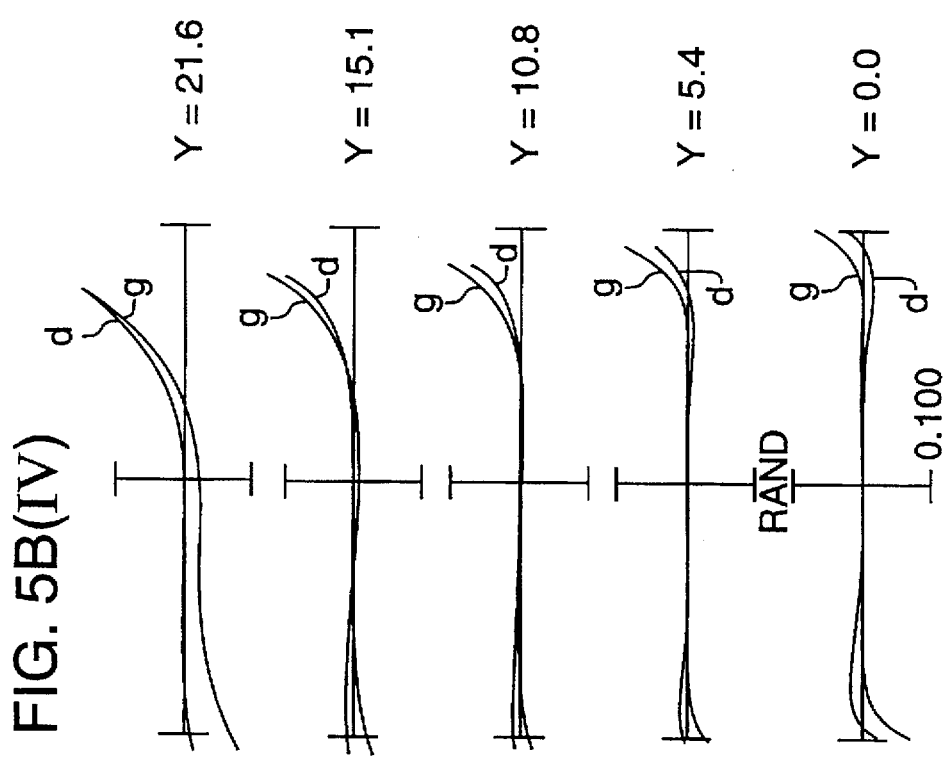
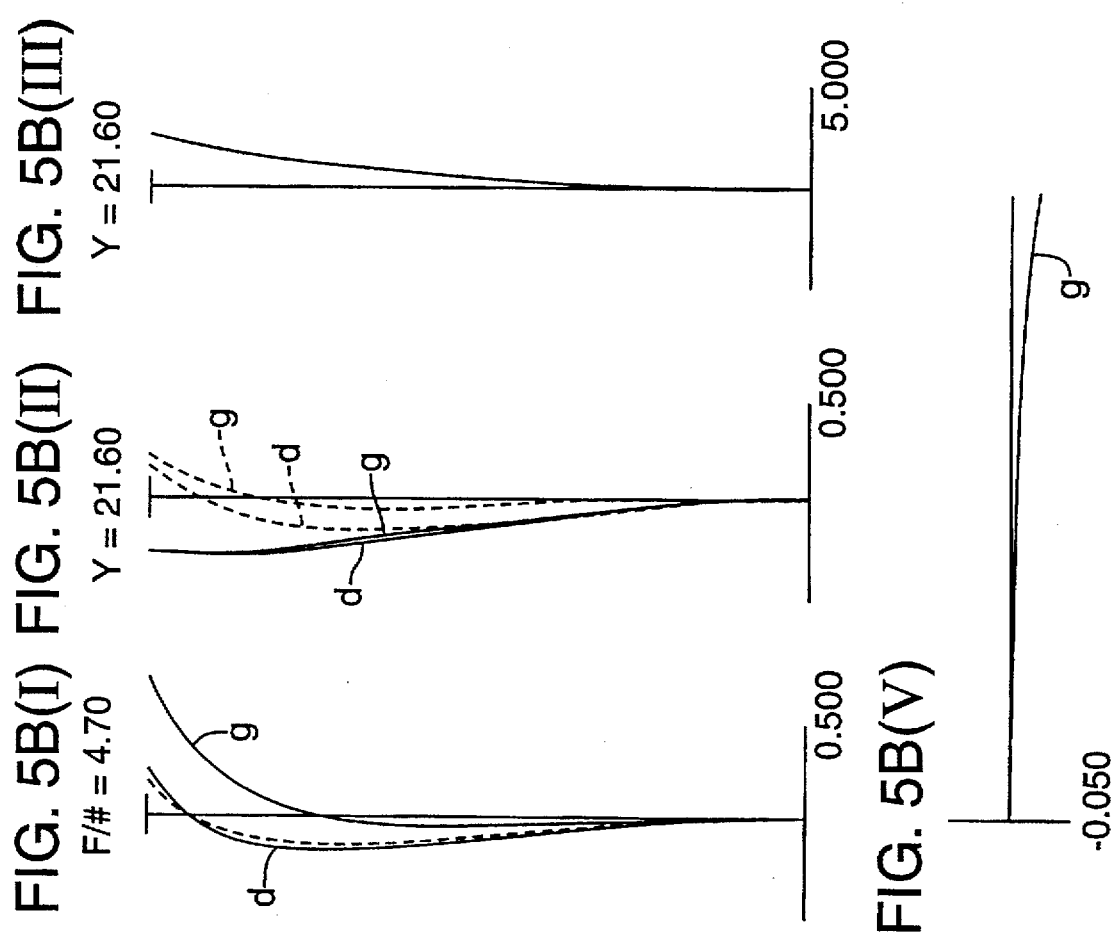
FIG. 5B(I) F/#=4.70
FIG. 5B(II) Y=21.60
FIG. 5B(III) Y=21.60
FIG. 5B(IV)
FIG. 5B(V)

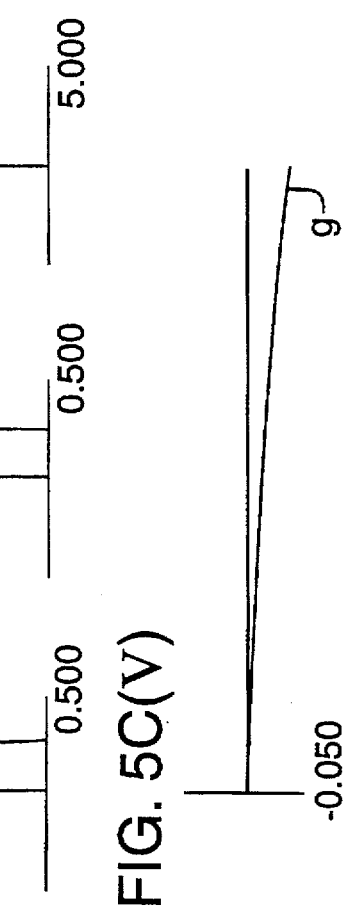
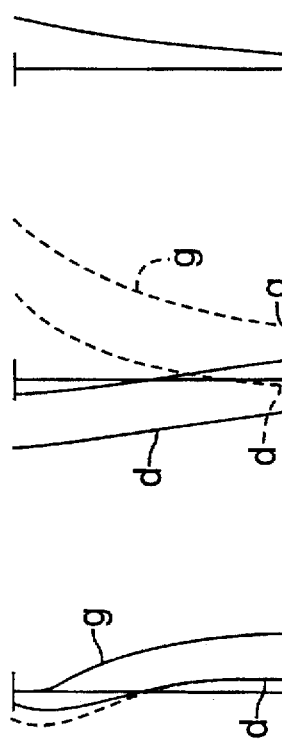
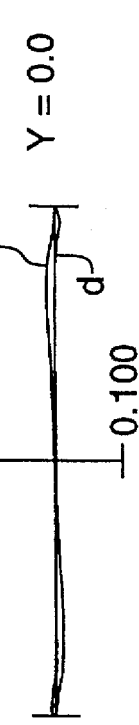
FIG. 5C(I)  FIG. 5C(II)  FIG. 5C(III)  FIG. 5C(IV)  FIG. 5C(V)

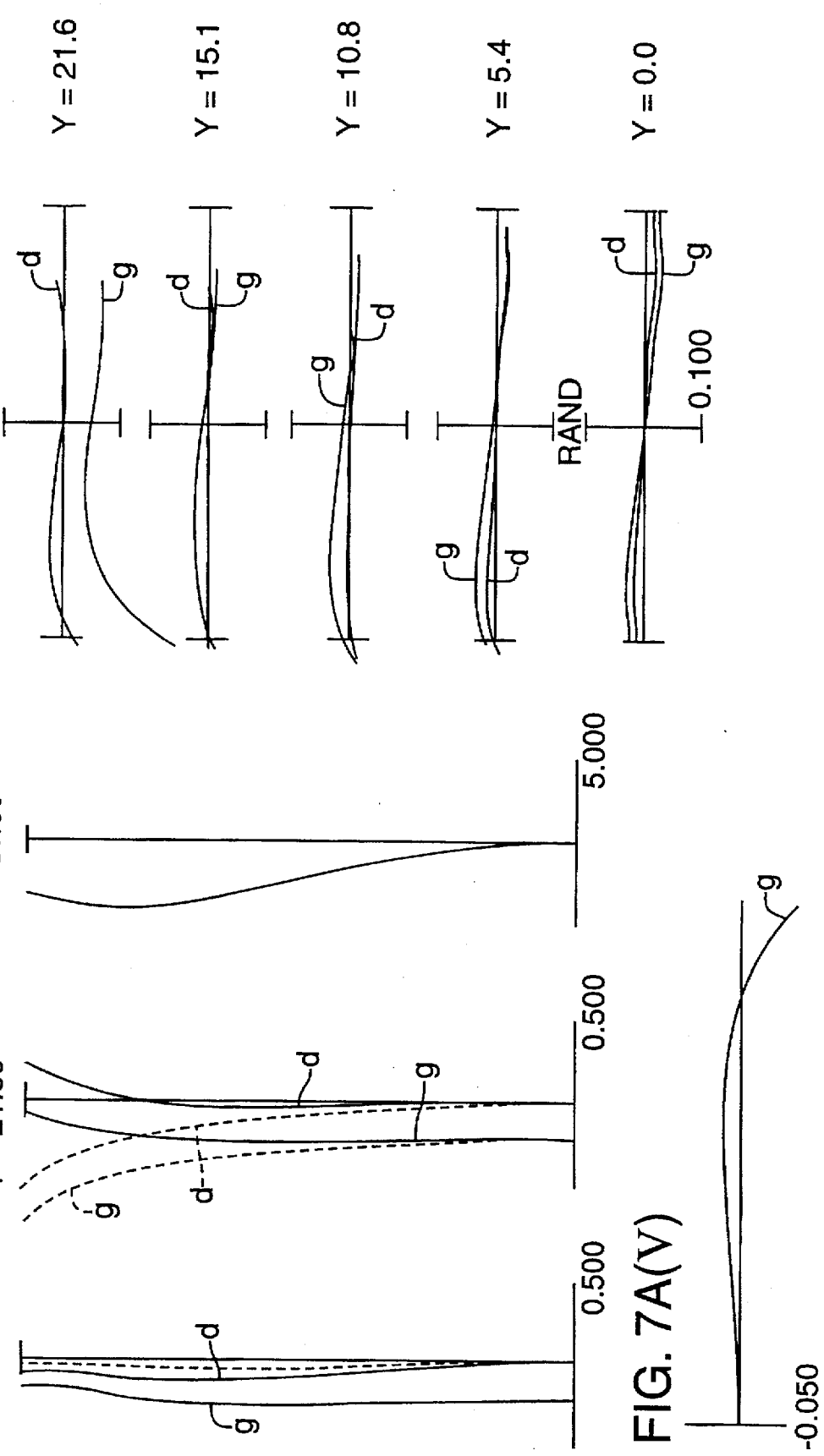

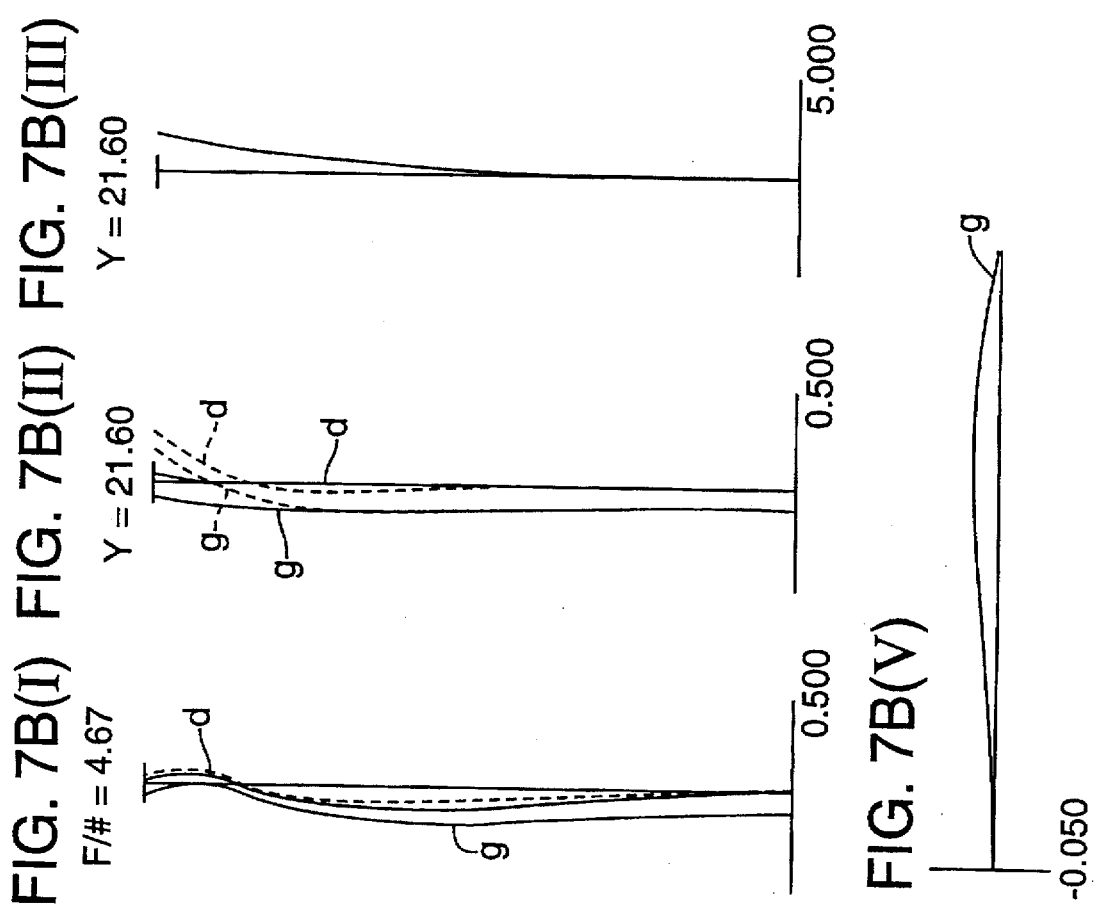

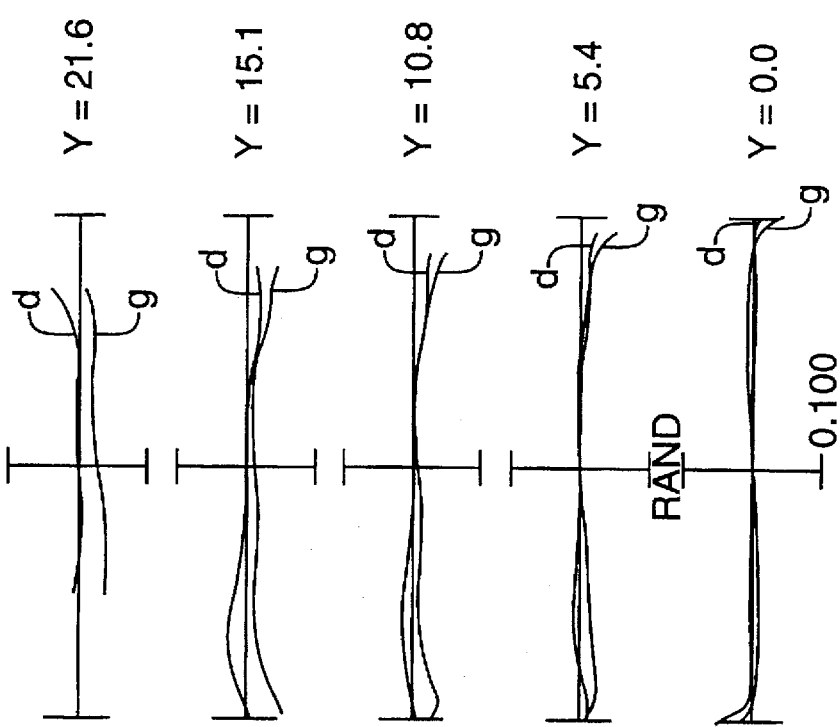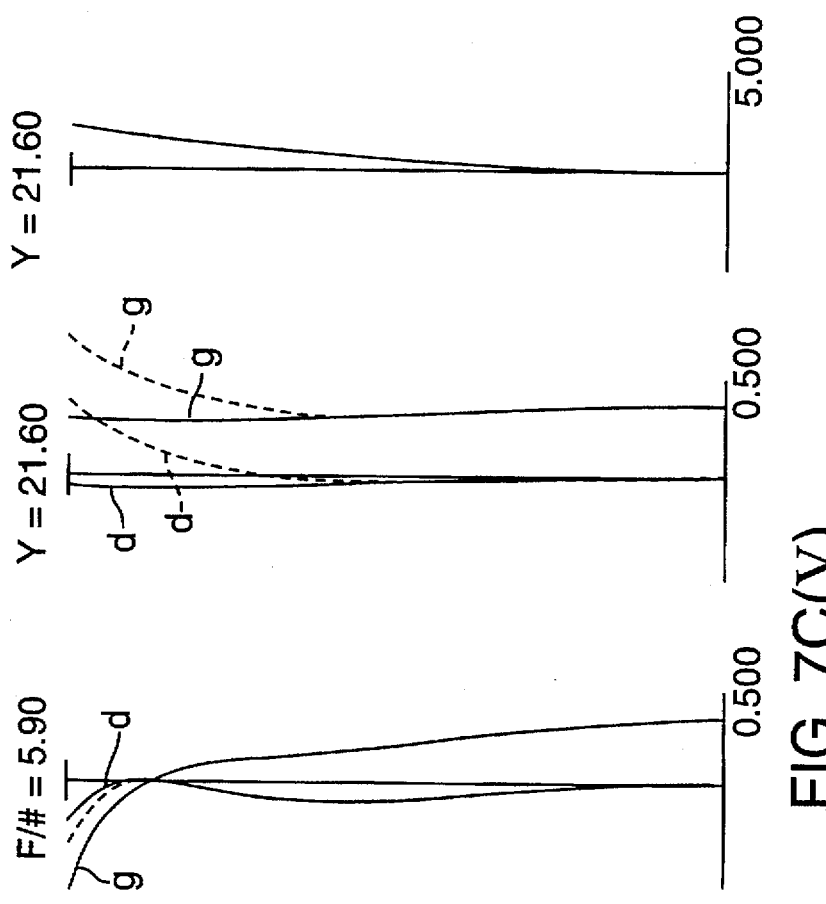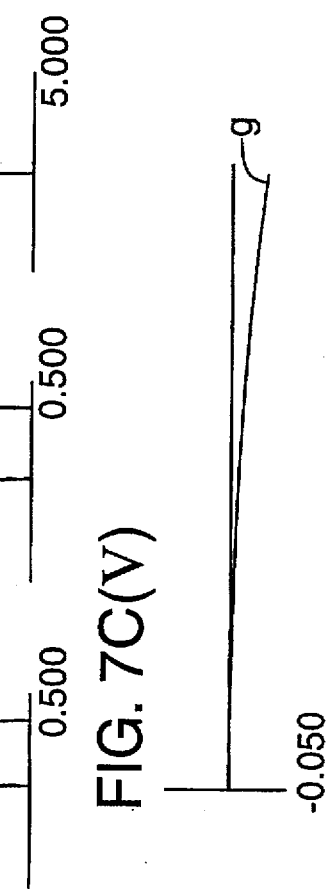
FIG. 7C(I)   FIG. 7C(II)   FIG. 7C(III)   FIG. 7C(IV)   FIG. 7C(V)

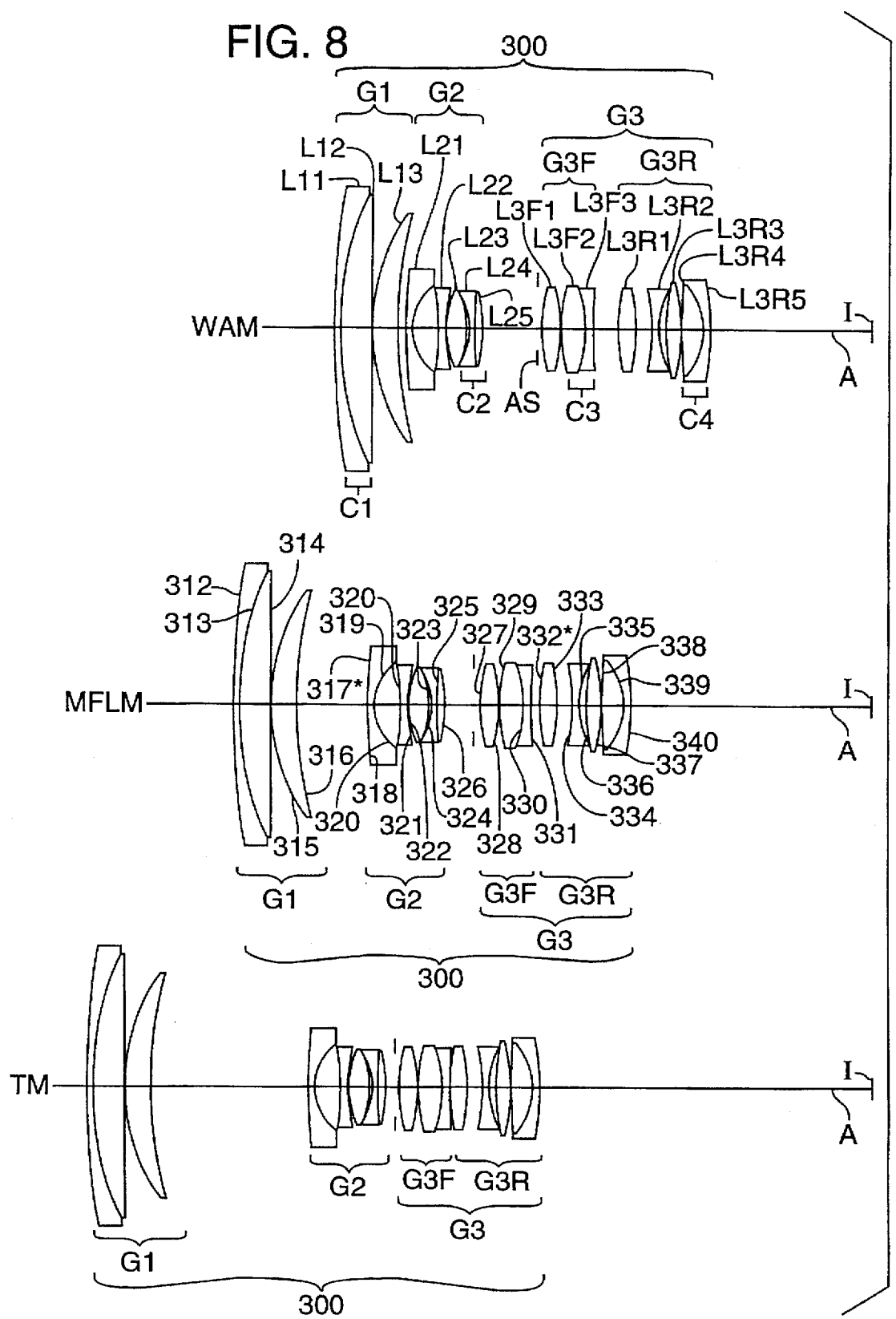

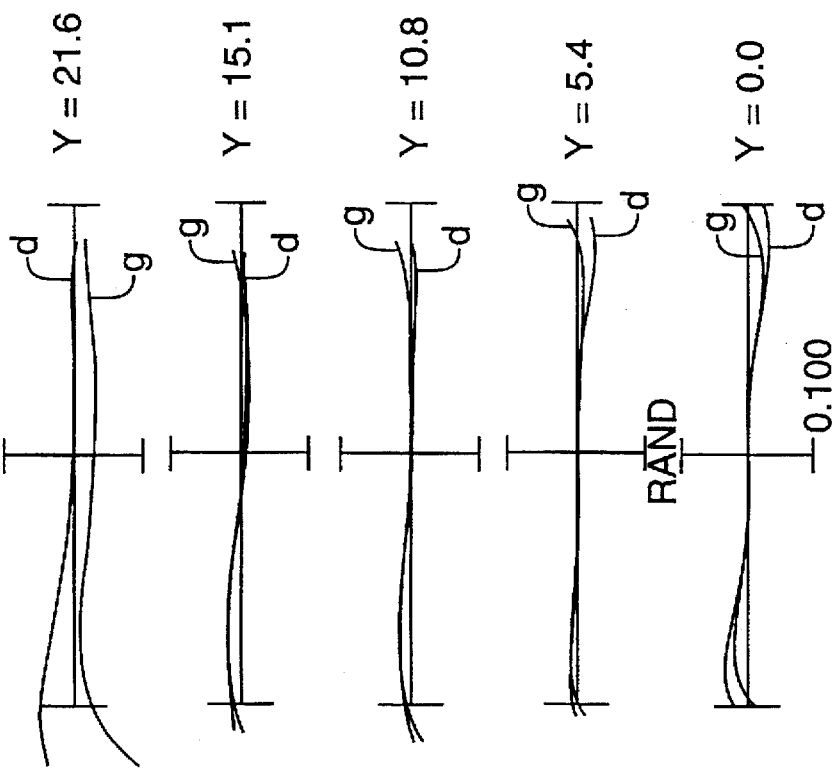
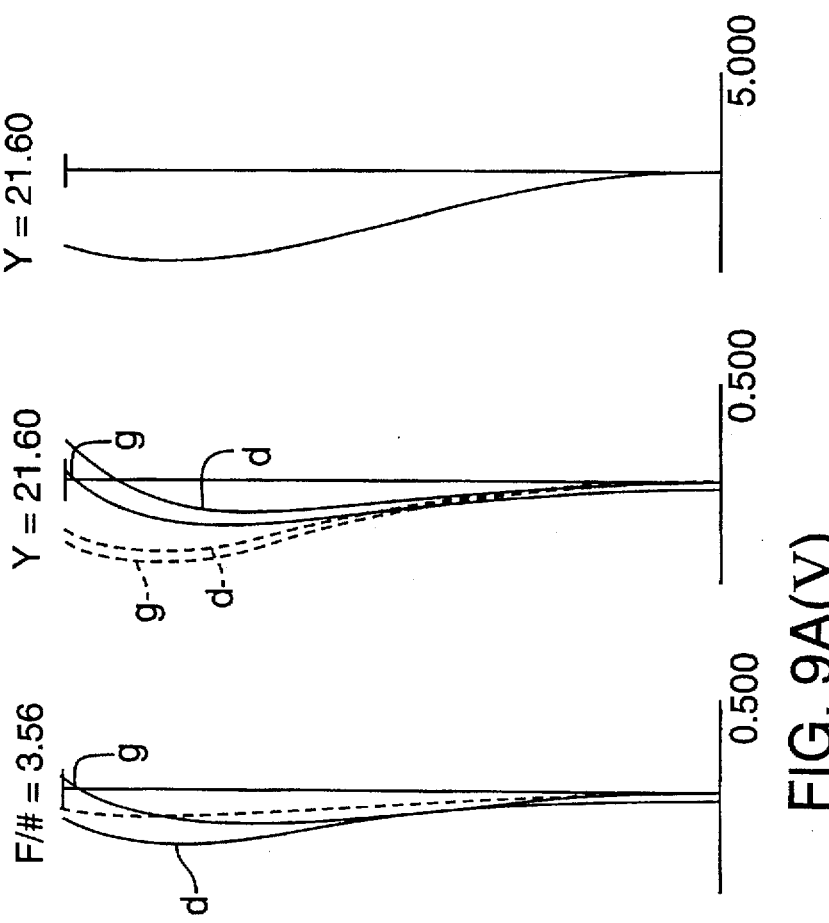
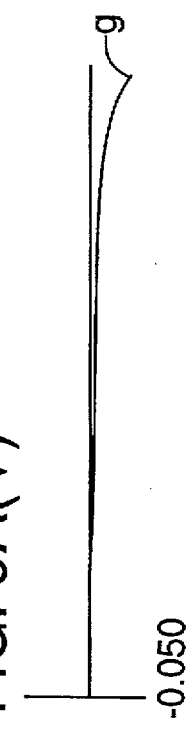

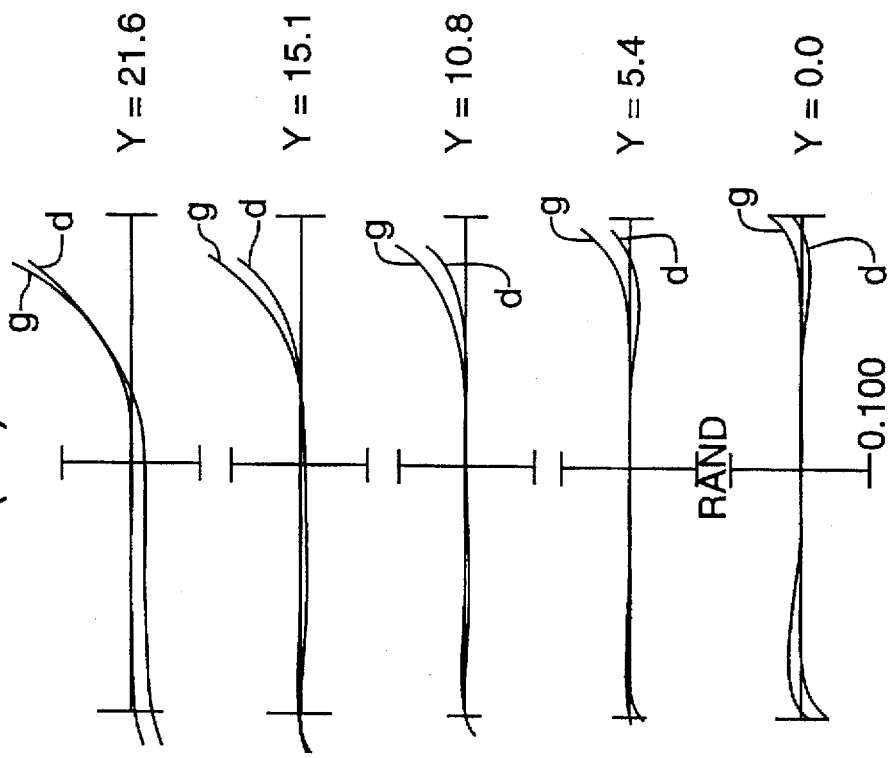
FIG. 9B(I) FIG. 9B(II) FIG. 9B(III) FIG. 9B(IV) FIG. 9B(V)

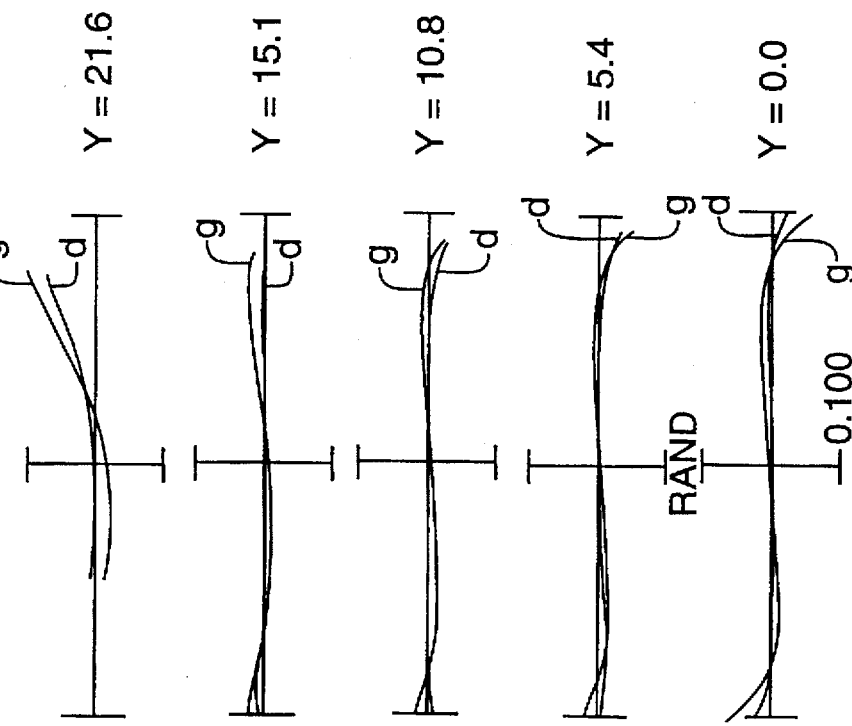
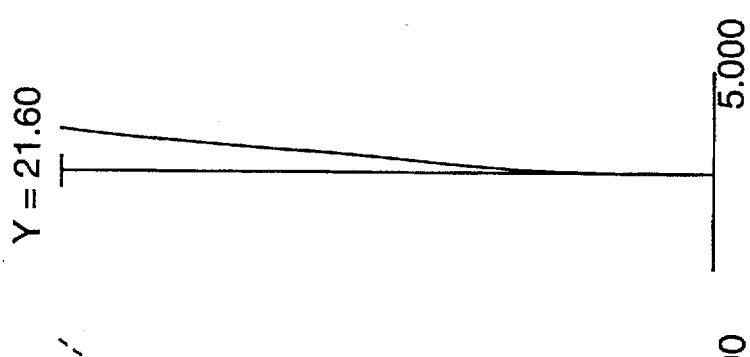
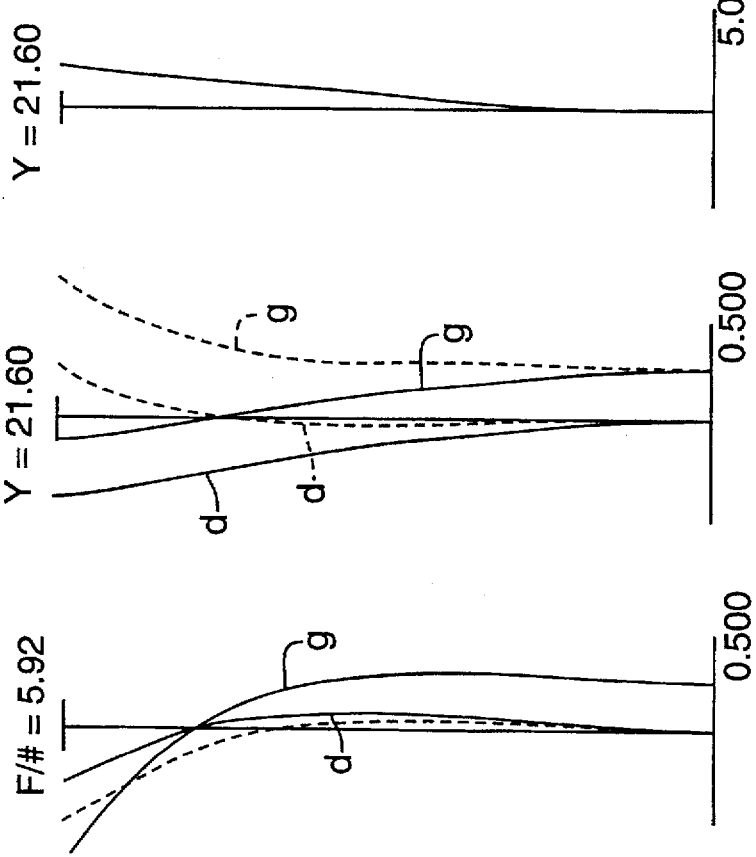
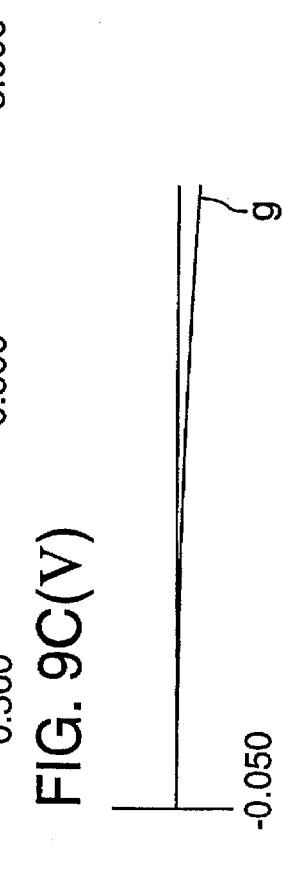

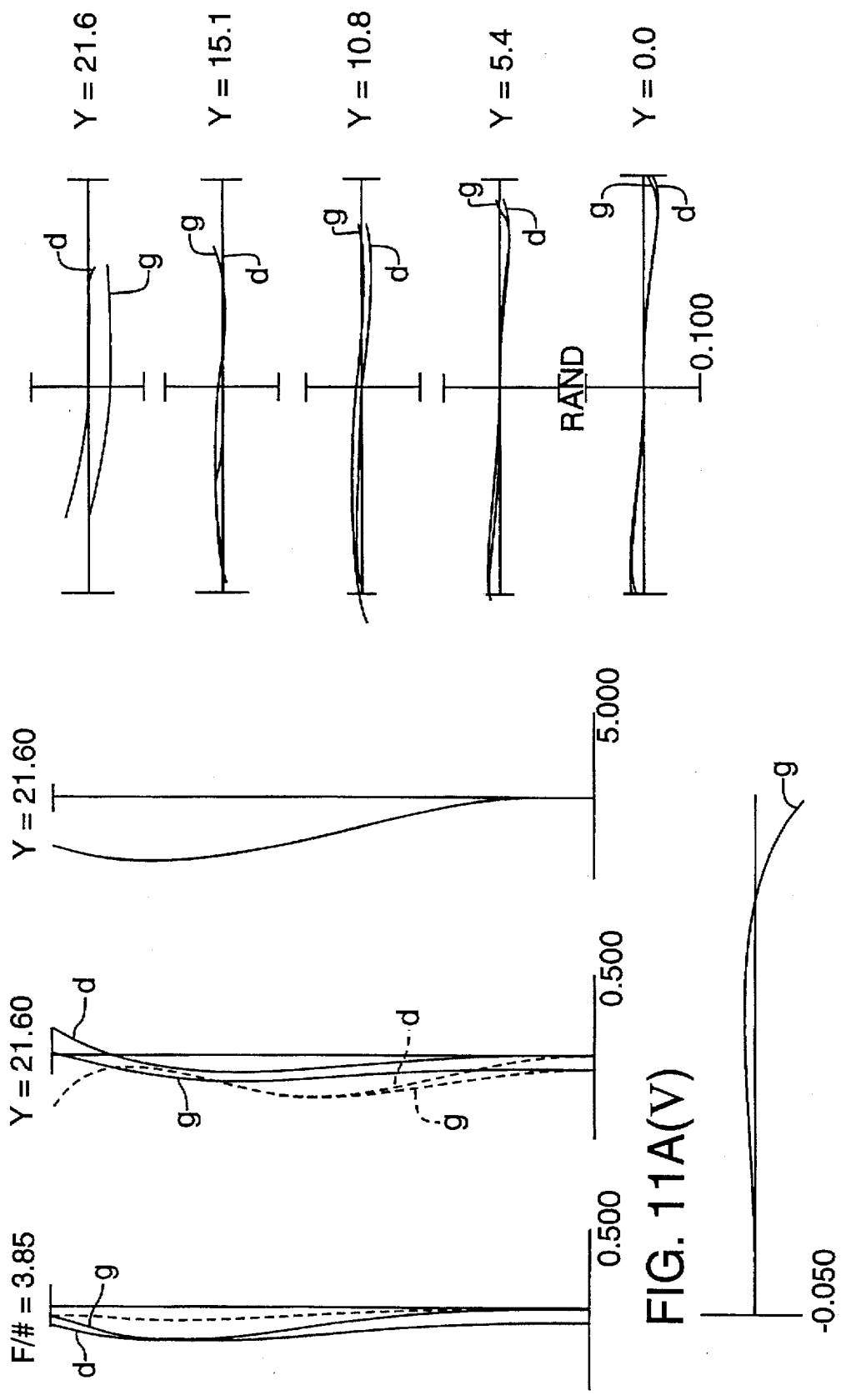

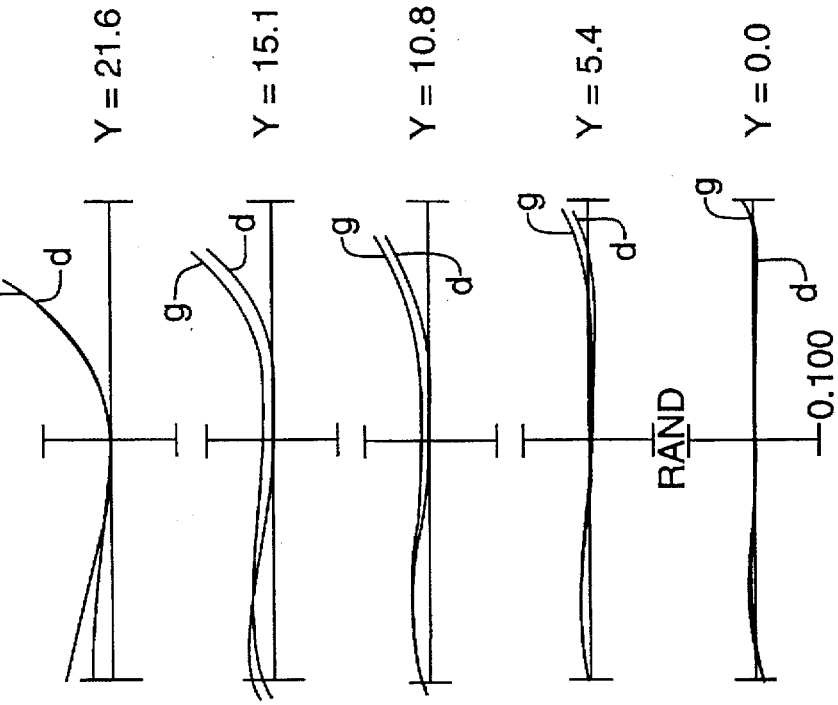
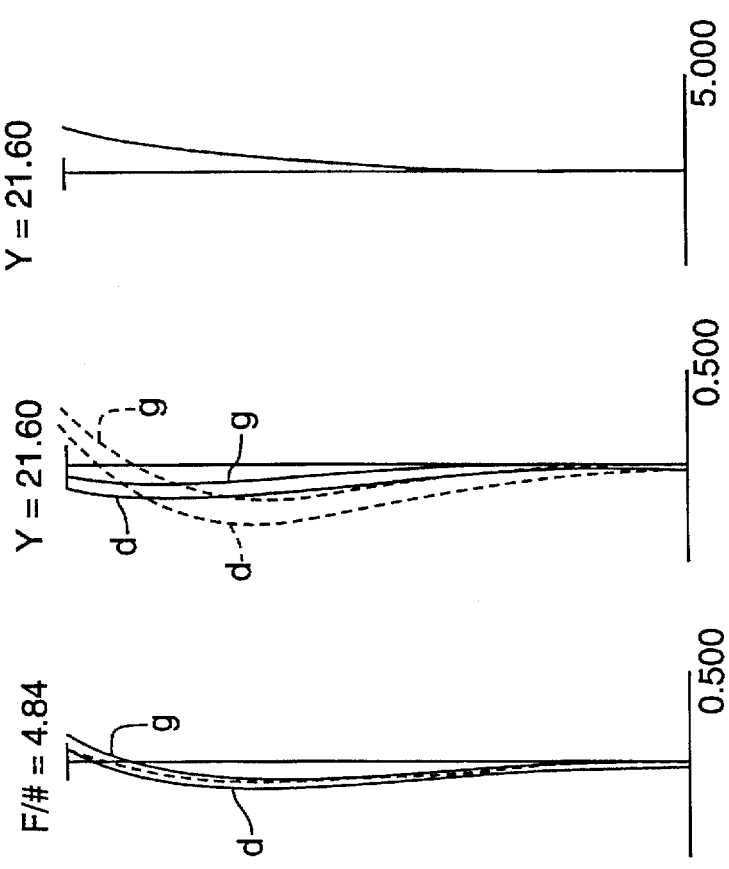
FIG. 11B(I)  FIG. 11B(II)  FIG. 11B(III)
FIG. 11B(IV)
FIG. 11B(V)

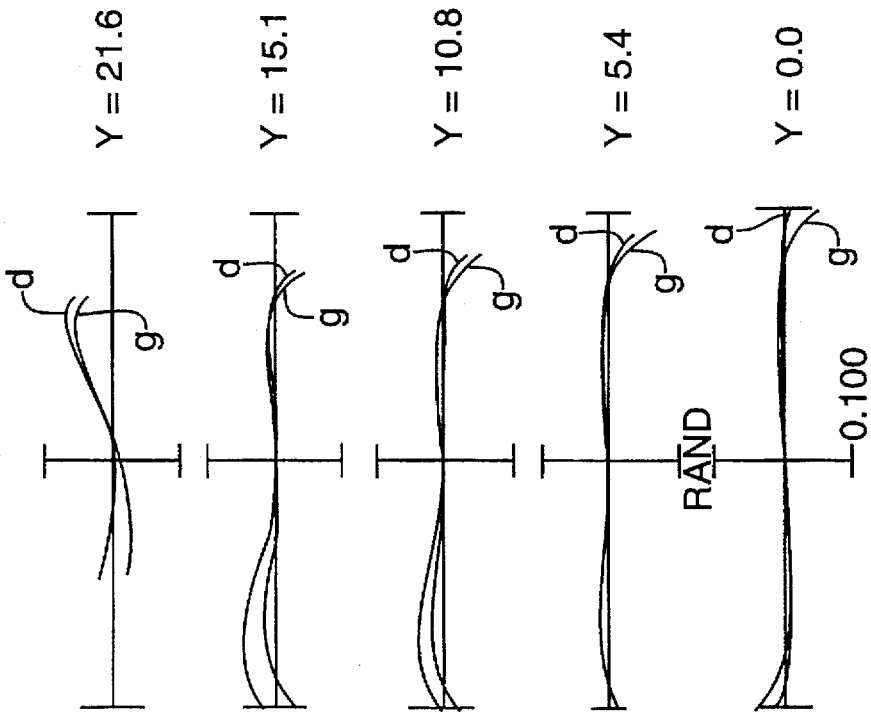
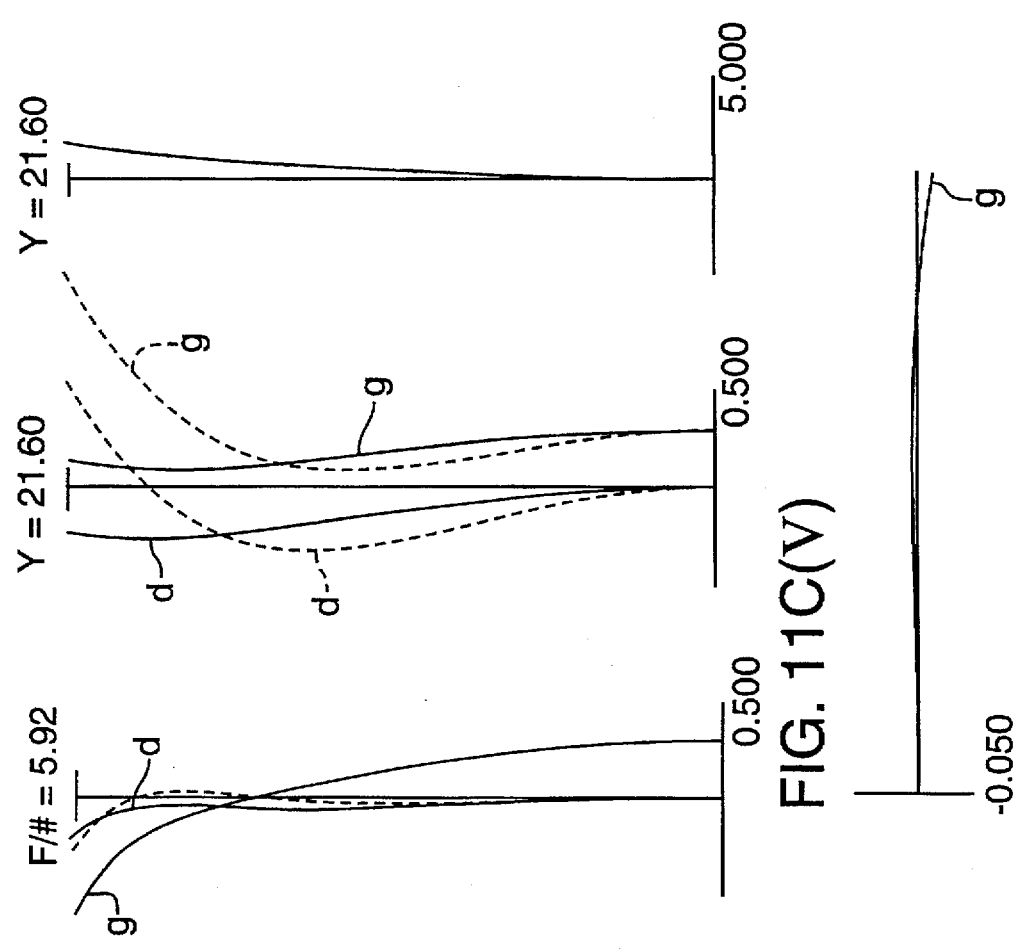
FIG. 11C(I) FIG. 11C(II) FIG. 11C(III) FIG. 11C(IV)
FIG. 11C(V)

HIGH-MAGNIFICATION WIDE-ANGLE ZOOM LENS

This application is a continuation of application Ser. No. 08/533,957, filed on Sep. 26, 1995 abandoned.

FIELD OF THE INVENTION

This invention relates to zoom lenses, more particularly to high-magnification wide-angle zoom lenses having a positive-negative-positive refractive power arrangement.

BACKGROUND OF THE INVENTION

When using a photographic, television, or video camera, it is often desirable to have the flexibility to obtain both close-up and wide-angle images of a subject. In order to obtain images over a wide range of magnifications and fields of view without having to change the imaging lens, a "zoom" imaging lens is often used.

A "zoom lens" has a focal length that can be varied continuously over a defined range to provide variable magnification. Focal-length changes are normally made by moving one or more lens groups in the lens, usually by adjusting the length of the lens barrel. "True" zoom lenses have a parfocal property, i.e., relative motions of lens groups are coordinated so as to maintain the image formed by the lens in a substantially fixed plane (in contrast to a "vari-focal" zoom lens with which the image is not maintained in a substantially fixed plane as the focal length is changed). True zoom lenses are normally preferred because they do not need to be refocused after changing the focal length. Differential motion of lens groups is achieved most commonly through the use of one or more high-precision cams in the lens barrel.

There has been a great deal of effort in recent years devoted to the design and construction of compact, high zoom-ratio zoom lenses (including operability in a wide-angle mode), driven at least in part by a trend in miniaturization of video and still cameras. Such state-of-the-art zoom lenses almost invariably comprise lens elements in multiple groups arranged, for example, in a positive-negative-positive-positive, positive-negative-positive-negative, or positive-negative-positive-negative-positive refractive power arrangement. Typically, this arrangement allows for the overall power of the zoom lens to be sufficiently distributed over the various lens groups so as to facilitate aberration correction, and to provide substantially parallel light between the axially movable lens groups (i.e., "zoom groups") and stationary group(s). In addition, lens elements comprising the telescopic front objective lens group tend have a large clear aperture so as to gather sufficient light to form a bright image over the entire range of magnification, which is of particular importance in video camera and other motion-picture camera imaging.

Multi-group zoom lenses in which the first three lens groups are arranged in a positive-negative-positive arrangement have not been considered well-suited for forming the basis of a "very-wide-angle" lens, i.e., a lens capable of achieving a field angle of about 80° or greater. This is particularly true of zoom lenses having a zoom ratio of about 5-fold or greater. The main reason for this is a conventional perception that the second lens group (having negative refractive power) presents a serious obstacle for simultaneously achieving both a very-wide field angle and a high degree of aberration correction over the entire range of magnification. Thus, there are very few, if any, high-performance very-wide-angle zoom lenses, especially compact zoom lenses, having a positive-negative-positive lens group refracting power arrangement and also having a zoom ratio of at least about 5-fold.

Japanese patent application no. Sho 57-161824 discloses a four-group zoom lens having a positive-negative-positive-positive refractive power arrangement of lens groups. However, the zoom lens disclosed therein has, for wide-angle use, a field angle of approximately 62°. Also, the lens is not sufficiently compact. Moreover, the lens cannot be readily modified to provide a larger field angle because of the combination of the zooming method and the refractive power of the second lens group, and associated problems of correcting astigmatism and field curvature.

Japanese patent application no. HEI 4-149402 discloses a four-group zoom lens having a positive-negative-positive-positive refractive power arrangement of lens groups. The zoom lens disclosed therein has, for wide-angle use, a field angle of approximately 76°. The lens also has a high zoom ratio, and is suitably compact. However, these features have been provided at the expense of imaging performance because astigmatism, distortion, and coma increase as the lens is zoomed from a telephoto mode to a wide-angle mode. In addition, the relatively large amount of refractive power of the second lens group in this zoom lens makes it difficult to minimize the Petzval sum and thereby control field curvature. In short, although this lens would initially appear to be suitable from the standpoint of compactness, field angle and zoom ratio, closer examination reveals shortcomings with aberration correction in the wide-angle mode that make the lens unsuitable for applications demanding high-performance imaging.

Japanese patent application no. SHO 57-169716 discloses a zoom lens having a positive-negative-positive-positive refractive power arrangement of lens groups. The zoom lens disclosed therein is compact, but has a wide-angle field angle of only about 62° and a zoom ratio of only about 3-fold. In addition, this lens cannot be readily modified to achieve a higher zoom ratio because accommodating an extended range of axial motion of the second lens group necessary for achieving a higher magnification would require making the entire lens longer.

Therefore, there is a need for high-performance super-wide-angle zoom lenses having a positive-negative-positive refracting power arrangement, a zoom ratio of at least about 5-fold, and sufficient compactness to be suitable for use with a state-of-the-art motion picture or still camera.

SUMMARY OF THE INVENTION

The foregoing need is met by a multi-element zoom lens according to the present invention having at least three lens groups disposed on an optical axis. Objectwise to imagewise, the first lens group has positive refractive power, the second lens group has negative refractive power, and the third lens group has positive refractive power. The third lens group preferably comprises a "front" (i.e., objectwise) lens group having positive refractive power, and a "rear" (i.e., imagewise) lens group that preferably (but not necessarily) has a positive refractive power.

The first and second lens groups, as well as the front and rear lens groups of the third lens group, are preferably disposed relative to each other so as to be axially movable over respective zooming ranges so as to enable the zoom lens to provide an image on an image plane of an object over a range of zoom-lens focal lengths from wide angle to telephoto. Preferably, when zooming from the shortest focal length $f_W$ obtainable with the lens (in the wide-angle mode)

to the longest focal length obtainable with the lens (in the telephoto mode), at least the first lens group and the second lens group are separately movable objectwise, and the front and rear lens groups of the third lens group are independently axially movable objectwise.

The second lens group comprises axially, objectwise to imagewise, at least two negative lenses, at least one positive lens element, and at least one negative lens. Also, with respect to the second lens group, the following condition is preferably satisfied:

$$-1.5 \leq X_{2T}/f_W \leq -0.3$$

wherein $X_{2T}$ is the axial distance over which the second lens group moves whenever the zoom lens is being zoomed from the shortest focal length $f_W$ achievable with the zoom lens to the longest focal length achievable with the zoom lens and an object imaged by the zoom lens is situated at "infinity" relative to the zoom lens. The variable $X_{2T}$ is negative whenever the second lens group has moved objectwise during zooming from the shortest focal length to the longest focal length. Furthermore, the positive lens in the second lens group preferably satisfies the condition:

$$-1 < (r_{G2R} + r_{G2F})/(r_{G2R} - r_{G2F}) < 1$$

wherein $r_{G2R}$ is the radius of curvature of the imagewise surface of the subject positive lens and $r_{G2F}$ is the radius of curvature of the objectwise surface of the subject positive lens.

A zoom lens according to the present invention also preferably satisfies at least one of the following conditions:

$$0.3 \leq |f_2|/f_W \leq 0.8$$

$$0.35 \leq f_{G3F}/f_{G3R} \leq 0.8$$

wherein $f_2$ is the focal length of the second lens group, $f_{G3F}$ is the focal length of the front lens group of the third lens group, and $f_{G3R}$ is the focal length of the rear lens group of the third lens group.

Further preferably in a zoom lens according to the present invention, the second lens group comprises a lens element having either a negative aspherical surface having a refractive power profile that decreases with increasing lateral distance from the optical axis, or a positive aspherical surface having a refractive power profile that increases with increasing lateral distance from the optical axis. If present, the aspherical surface in the second lens group preferably satisfies the condition:

$$0 < (|AS_1 - S_1|)/f_W \leq 0.1$$

wherein $AS_1-S_1$ represents a distance, as measured at the edge of the aspheric lens element in a direction parallel to the optical axis, between the aspherical surface and its corresponding reference spherical surface.

Alternatively or in addition to an aspherical surface in the second lens group, the third lens group in a zoom lens according to the present invention can include a lens element having a negative aspherical surface having a refractive power profile that decreases with increasing lateral distance from the optical axis. If present, the aspherical surface in the third lens group preferably satisfies the condition:

$$0 < (|AS_2 - S_2|)/f_W \leq 0.05$$

wherein $AS_2-S_2$ represents a distance, as measured at the edge of the aspheric lens element in a direction parallel to the optical axis, between the aspherical surface and its corresponding reference spherical surface.

Most preferably, the second lens group comprises, objectwise to imagewise, a first negative lens, a second negative lens, a positive lens, and a third negative lens. In such a zoom lens, the following condition is preferably satisfied:

$$0.7 \leq f_{21}/f_2 \leq 1.6$$

wherein $f_{21}$ is the focal length of the first (i.e., most objectwise) negative lens.

In a zoom lens according to the present invention, the rear lens group of the third lens group preferably comprises a compound lens including a negative lens element having a D-line refractive index $n_n$ cemented to a positive lens element having a D-line refractive index $n_p$, wherein the compound lens satisfies the condition:

$$0.15 \leq n_n - n_p \leq 0.45$$

Most preferably, the compound lens is the most imagewise lens in the third lens group.

Further preferably, the rear lens group of the third lens group comprises multiple positive lenses including a positive lens satisfying the condition:

$$-1 < (r_{G3RR} + r_{G3RF})/(r_{G3RR} - r_{G3RF}) < 1$$

wherein $r_{G3RR}$ is the radius of curvature of the imagewise lens surface and $r_{G3RF}$ is the radius of curvature of the objectwise lens surface of the subject positive lens. Most preferably, this positive lens is the most objectwise positive lens in the rear lens group.

Further preferably in a zoom lens according to the present invention, the second lens group is axially movable for focusing. In such a zoom lens, the second lens group preferably satisfies the condition:

$$-0.9 \leq \beta_{2T} \leq -0.2$$

wherein $\beta_{2T}$ is the lateral magnification of the second lens group at the longest focal length (in the telephoto mode) obtainable with the zoom lens when imaging an object situated at "infinity" relative to the zoom lens.

According to yet another aspect of the present invention, a zoom lens is provided having a maximal field of view in the wide-angle mode of at least about 80°, a zoom ratio of at least about 5-fold, and that is able to produce an acceptable image of an object over a range of magnification from the wide-angle mode to the telephoto mode.

In zoom lenses according to the present invention, an aperture stop preferably is included in the zoom lens, disposed preferably objectwise relative to the third lens group.

According to yet other aspects of the present invention, zoom lenses are provided that individually have characteristics as set forth in any of Working Examples 1–5 herein. Preferably, such zoom lenses exhibit a focal-length range, from the wide-angle mode to the telephoto mode, of at least 5-fold, and a field angle in the wide-angle mode of at least 80°.

Other aspects and advantages of the present invention can be ascertained from the following detailed description and drawings.

BRIEF DESCRIPTION OF THE DRAWINGS

FIG. 3(A)(I) is a spherical aberration plot for Working Example 1, wide-angle mode.

FIG. 3(A)(II) is an astigmatism plot for Working Example 1, wide-angle mode.

FIG. 3(A)(III) is a distortion plot for Working Example 1, wide-angle mode.

FIG. 3(A)(IV) is a lateral aberration plot for Working Example 1, wide-angle mode.

FIG. 3(A)(V) is a lateral chromatic aberration plot for Working Example 1, wide-angle mode.

FIG. 3(B)(I) is a spherical aberration plot for Working Example 1, mid-focal length mode.

FIG. 3(B)(II) is an astigmatism plot for Working Example 1, mid-focal length mode.

FIG. 3(B)(III) is a distortion plot for Working Example 1, mid-focal length mode.

FIG. 3(B)(IV) is a lateral aberration plot for Working Example 1, mid-focal length mode.

FIG. 3(B)(V) is a lateral chromatic aberration plot for Working Example 1, mid-focal length mode.

FIG. 3(C)(I) is a spherical aberration plot for Working Example 1, telephoto mode.

FIG. 3(C)(II) is an astigmatism plot for Working Example 1, telephoto mode.

FIG. 3(C)(III) is a distortion plot for Working Example 1, telephoto mode.

FIG. 3(C)(IV) is a lateral aberration plot for Working Example 1, telephoto mode.

FIG. 3(C)(V) is a lateral chromatic aberration plot for Working Example 1, telephoto mode.

FIG. 5(A)(I) is a spherical aberration plot for Working Example 2, wide-angle mode.

FIG. 5(A)(II) is an astigmatism plot for Working Example 2, wide-angle mode.

FIG. 5(A)(III) is a distortion plot for Working Example 2, wide-angle mode.

FIG. 5(A)(IV) is a lateral aberration plot for Working Example 2, wide-angle mode.

FIG. 5(A)(V) is a lateral chromatic aberration plot for Working Example 2, wide-angle mode.

FIG. 5(B)(I) is a spherical aberration plot for Working Example 2, mid-focal length mode.

FIG. 5(B)(II) is an astigmatism plot for Working Example 2, mid-focal length mode.

FIG. 5(B)(III) is a distortion plot for Working Example 2, mid-focal length mode.

FIG. 5(B)(IV) is a lateral aberration plot for Working Example 2, mid-focal length mode.

FIG. 5(B)(V) is a lateral chromatic aberration plot for Working Example 2, mid-focal length mode.

FIG. 5(C)(I) is a spherical aberration plot for Working Example 2, telephoto mode.

FIG. 5(C)(II) is an astigmatism plot for Working Example 2, telephoto mode.

FIG. 5(C)(III) is a distortion plot for Working Example 2, telephoto mode.

FIG. 5(C)(IV) is a lateral aberration plot for Working Example 2, telephoto mode.

FIG. 5(C)(V) is a lateral chromatic aberration plot for Working Example 2, telephoto mode.

FIG. 7(A)(I) is a spherical aberration plot for Working Example 3, wide-angle mode.

FIG. 7(A)(II) is an astigmatism plot for Working Example 3, wide-angle mode.

FIG. 7(A)(III) is a distortion plot for Working Example 3, wide-angle mode.

FIG. 7(A)(IV) is a lateral aberration plot for Working Example 3, wide-angle mode.

FIG. 7(A)(V) is a lateral chromatic aberration plot for Working Example 3, wide-angle mode.

FIG. 7(B)(I) is a spherical aberration plot for Working Example 3, mid-focal length mode.

FIG. 7(B)(II) is an astigmatism plot for Working Example 3, mid-focal length mode.

FIG. 7(B)(III) is a distortion plot for Working Example 3, mid-focal length mode.

FIG. 7(B)(IV) is a lateral aberration plot for Working Example 3, mid-focal length mode.

FIG. 7(B)(V) is a lateral chromatic aberration plot for Working Example 3, mid-focal length mode.

FIG. 7(C)(I) is a spherical aberration plot for Working Example 3, telephoto mode.

FIG. 7(C)(II) is an astigmatism plot for Working Example 3, telephoto mode.

FIG. 7(C)(III) is a distortion plot for Working Example 3, telephoto mode.

FIG. 7(C)(IV) is a lateral aberration plot for Working Example 3, telephoto mode.

FIG. 7(C)(V) is a lateral chromatic aberration plot for Working Example 3, telephoto mode.

FIG. 8 is an optical diagram of the embodiment of Working Example 4 in the wide-angle, mid-focal length, and telephoto modes.

FIG. 9(A)(I) is a spherical aberration plot for Working Example 4, wide-angle mode.

FIG. 9(A)(II) is an astigmatism plot for Working Example 4, wide-angle mode.

FIG. 9(A)(III) is a distortion plot for Working Example 4, wide-angle mode.

FIG. 9(A)(IV) is a lateral aberration plot for Working Example 4, wide-angle mode.

FIG. 9(A)(V) is a lateral chromatic aberration plot for Working Example 4, wide-angle mode.

FIG. 9(B)(I) is a spherical aberration plot for Working Example 4, mid-focal length mode.

FIG. 9(B)(II) is an astigmatism plot for Working Example 4, mid-focal length mode.

FIG. 9(B)(III) is a distortion plot for Working Example 4, mid-focal length mode.

FIG. 9(B)(IV) is a lateral aberration plot for Working Example 4, mid-focal length mode.

FIG. 9(B)(V) is a lateral chromatic aberration plot for Working Example 4, mid-focal length mode.

FIG. 9(C)(I) is a spherical aberration plot for Working Example 4, telephoto mode.

FIG. 9(C)(II) is an astigmatism plot for Working Example 4, telephoto mode.

FIG. 9(C)(III) is a distortion plot for Working Example 4, telephoto mode.

FIG. 9(C)(IV) is a lateral aberration plot for Working Example 4, telephoto mode.

FIG. 9(C)(V) is a lateral chromatic aberration plot for Working Example 4, telephoto mode.

FIG. 11(A)(I) is a spherical aberration plot for Working Example 5, wide-angle mode.

FIG. 11(A)(II) is an astigmatism plot for Working Example 5, wide-angle mode.

FIG. 11(A)(III) is a distortion plot for Working Example 5, wide-angle mode.

FIG. 11(A)(IV) is a lateral aberration plot for Working Example 5, wide-angle mode.

FIG. 11(A)(V) is a lateral chromatic aberration plot for Working Example 5, wide-angle mode.

FIG. 11(B)(I) is a spherical aberration plot for Working Example 5, mid-focal length mode.

FIG. 11(B)(II) is an astigmatism plot for Working Example 5, mid-focal length mode.

FIG. 11(B)(III) is a distortion plot for Working Example 5, mid-focal length mode.

FIG. 11(B)(IV) is a lateral aberration plot for Working Example 5, mid-focal length mode.

FIG. 11(B)(V) is a lateral chromatic aberration plot for Working Example 5, mid-focal length mode.

FIG. 11(C)(I) is a spherical aberration plot for Working Example 5, telephoto mode.

FIG. 11(C)(II) is an astigmatism plot for Working Example 5, telephoto mode.

FIG. 11(C)(III) is a distortion plot for Working Example 5, telephoto mode.

FIG. 11(C)(IV) is a lateral aberration plot for Working Example 5, telephoto mode.

FIG. 11(C)(V) is a lateral chromatic aberration plot for Working Example 5, telephoto mode.

DETAILED DESCRIPTION OF THE INVENTION

Figure 1:
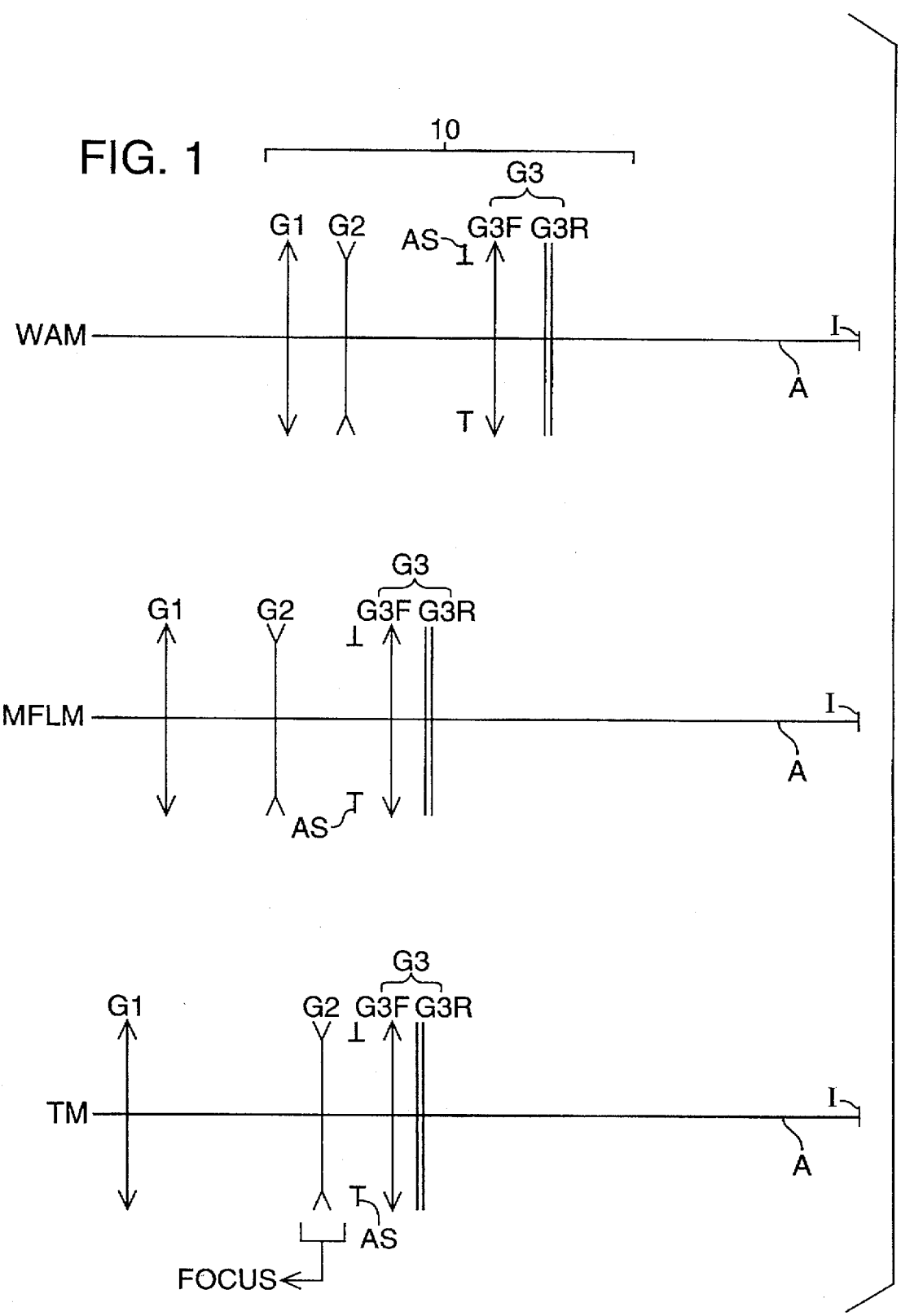
FIG. 1 is a schematic optical diagram of lens groups comprising a zoom lens according to the present invention, including relative positions of these groups in a wide-angle mode (WAM), a mid-focal length mode (MFLM), and a telephoto mode (TM).

The following expressions, terms and conventions are used herein:

In an optical diagram, light travels left to right from object to image.

A "positive" distance or direction along an optical axis extends from left to right (i.e., objectwise to imagewise); a "negative" distance or direction extends from right to left (i.e, imagewise to objectwise).

The "radius of curvature" of an optical surface (such as the surface of a lens element) is "positive" whenever the center of curvature lies to the right of the surface, and "negative" whenever the center of curvature lies to the left of the surface.

The "field angle" $2\omega$ is the twice the angle $\omega$ subtended by the principal ray and the optical axis, as measured at the entrance pupil, for the principal ray intersecting the image plane at the edge of the image field. The field angle is largest in the extreme wide-angle mode.

The "wide-angle mode" (abbreviated "WAM") refers to a configuration of the lens groups in the zoom lens whenever the lens is used as a wide-angle lens. A "wide-angle" lens is a lens having a field angle greater than about 50°.

The "telephoto mode" (abbreviated "TM") refers to a configuration of the lens groups in the zoom lens whenever the lens is used as a telephoto lens. A "telephoto" lens is a lens having a field angle less than about 30°.

The "mid-focal length mode" (abbreviated "MFLM") refers to a configuration of the lens groups in the zoom lens whenever the lens is adjusted to have a focal length substantially mid-way between the extreme wide-angle and telephoto modes of the zoom lens.

The "zoom ratio" (V) is the ratio of the zoom lens focal length in the extreme telephoto mode ($f_T$), i.e., longest achievable focal length to the zoom lens focal length in the extreme wide-angle mode ($f_W$), i.e., shortest achievable focal length; that is, $V=f_T/f_W$.

The "Abbe number" ($V_d$) is the ratio $(n_D-1)/(n_F-n_C)$, where $n_D$ is the index of refraction in D-line light (589.3 nanometer wavelength), $n_F$ is the index of refraction in F-line light (486.1 nanometer wavelength) and $n_C$ is the index of refraction in C-line light (656.3 nanometer wavelength).

"Lateral chromatic aberration" is a measure of the difference in the magnification between F-line light and C-line light, measured in the image plane as an image height difference between the F-line principal rays and C-line principal rays.

"Transverse chromatic aberration" is a measure of the difference in the magnification between F-line light and C-line light, measured along the optical axis as difference in focus position between the F-line principal light rays and C-line principal light rays.

The "back focal length" is the distance along the optical axis between the lens surface closest to the image and the image.

"Linear" axial motion of a lens element or group means motion at a substantially constant velocity along the optical axis.

"Non-linear" axial motion of a lens element or group means motion at a non-constant, i.e., time-varying, velocity along the optical axis.

"High-performance imaging" is a term of art meaning that optical aberrations of the subject lens are corrected to a degree suitable for the particular imaging application.

The present invention provides, inter alia, a very-wide-angle, high zoom ratio zoom lens suitable for high-performance imaging with a still and/or motion-picture camera.

FIG. 1 provides general schematic optical diagrams of a preferred embodiment of a zoom lens 10 according to the present invention showing relative positions of constituent lens groups in a wide angle mode (WAM), mid-focal length mode (MFLM), and telephoto mode (TM). The zoom lens 10 comprises the following lens groups and components, arranged coaxially objectwise to imagewise along the optical axis A: (a) a first lens group G1 having positive refracting power; (b) a second lens group G2 having negative refracting power; (c) an aperture stop AS; and (d) a third lens group G3 comprised of a front lens group G3F having positive refracting power, and a rear lens group G3R preferably (but not necessarily) having positive refracting power. Representative lenses in each of these lens groups are illustrated in FIGS. 2, 4, 6, 8, and 10, and are discussed in detail in the Working Examples.

All of the above lens groups are axially movable; their coordinated movements are used to effectuate a change in magnification (i.e., focal length) while maintaining the image plane I at a substantially fixed position. Generally, as the lens 10 is "zoomed" from the wide-angle mode (WAM) to the mid-focal length mode (MFLM) and finally to the telephoto mode (TM), at least the first lens group G1 and the second lens group G2 move objectwise, and the front lens group G3F and the rear lens group G3R each move objectwise independently. More specifically, when zooming from the WAM to the TM, lens group G1 moves axially linearly objectwise along the optical axis A, lens group G2 moves axially non-linearly objectwise, lens group G3F moves axially non-linearly objectwise, and lens group G3R moves axially linearly objectwise. In addition, focusing on a nearby object is accomplished by axially moving lens group G2 as indicated in FIG. 1.

The lens group G2 plays a key role in providing a very wide field angle and high zoom ratio while also maintaining excellent imaging performance of the zoom lens 10. Lens groups G2 and G1 undergo coordinated movement during zooming, which allows the overall length of the zoom lens 10, as well as the clear aperture of the lens group G1 to be reduced. Consequently, lens group G2 has a relatively high refractive power (i.e., a relatively short focal length).

As discussed further below, there are practical limits to how much refractive power lens group G2 can have and how the refractive power can be distributed over the lens elements comprising the lens group. In general, the lens group G2 comprises, objectwise to imagewise, at least two negative lenses, at least one positive lens, and at least one negative lens element. Lens group G2 preferably has four to six lenses in, for example, a negative-negative-positive-negative or negative-negative-negative-positive-positive-negative, respectively, arrangement objectwise to imagewise.

It is also preferred that a lens element in lens group G2 and/or a lens element in lens group G3 have an aspherical surface in order to improve aberration correction and to allow for the largest possible field angle of the zoom lens. Such an aspherical surface can be formed by depositing glass or plastic or other suitable optical material onto the surface of a spherical lens element. Whenever the optical material used to form the aspherical surface in this manner has a different index of refraction than that of the underlying spherical lens element, the combination thereof effectively forms a two-element compound lens. However, it will be appreciated by those skilled in the art that, since the amount of optical material used in forming an aspherical surface in this manner has a thickness of typically about a millimeter or less, the combination of the optical material and the lens element onto which the optical material is deposited can be regarded as a single aspherical lens element, such as might be formed by polishing, grinding or otherwise shaping a lens element made of a single optical material.

It is preferred that lens group G3 contain at least one two-element compound lens in order to better correct coma and to better control the Petzval sum of the lens 10. Preferably, the compound lens is disposed in the lens group G3R. Most preferably, the compound lens is the most imagewise lens in the lens group G3R.

The lens group G3 is preferably configured so as to further correct aberrations of the zoom lens 10, as well as coordinate lens-group movements during zooming, and maintain compactness.

The lens group G3R is preferably configured to comprise either three lenses in a positive-negative-positive refractive power arrangement, or four lenses in a positive-negative-positive-negative refractive power arrangement. This is because coma of the lens 10 cannot be adequately corrected when the lens group G3 comprises only two lens elements. A three or four lens combination for lens group G3R facilitates improved correction of spherical aberration and distortion; these aberrations can be particularly troublesome when zooming from wide-angle mode to the telephoto mode, i.e, whenever the lens magnification is increased.

It is preferred that the following ten conditions be satisfied in order to carry out the best mode of the present invention.

The first condition relates to establishing the overall refractive power of lens group G2, and is expressed as:

$$0.3 \leq |f_2|/f_W \leq 0.8 \tag{1}$$

wherein $f_2$ is the focal length of lens group G2, and $f_W$ is the overall focal length of the zoom lens in the extreme wide-angle mode.

If $|f_2|/f_W$ were to exceed the upper limit of condition (1), then the focal length of lens group G2 would be so large that the overall negative refractive power of that lens group would be reduced. Consequently, lens group G2 would no longer have sufficient refractive power to bend light rays entering the lens 10 from the extremes of the field of view of the lens. This would cause reduced image brightness at the edges of the image produced by the lens. Although this consequence could be alleviated by increasing the clear aperture of the lens group G1, this approach would be undesirable because larger lens elements are generally more expensive. In addition, if a lens filter (such as, for example, a polarizing filter or a color filter) were to be attached to the lens objectwise of group G1, then the filter would have to be larger in size (and thus more expensive) as well.

Exceeding the upper limit of condition (1) would also require that the axial range of motion for zooming lens group G2 be excessively increased. This would cause an increase in the required axial range of motion for zooming of the other lens groups in the lens, thereby making the entire lens less compact. Exceeding the upper limit of condition (1) would also increase the difficulty of maintaining adequate back focus of the lens.

If $|f_2|/f_W$ were to be below the lower limit of condition (1), then the focal length of lens group G2 would be too small (i.e., the refracting power of the lens group would become too strong). Thus, even though the lens group G2 would retain a capability of bending light rays entering the lens from the extremes of the field of view and providing for sufficient back focus, aberration control would be difficult to achieve. More specifically, minimizing the Petzval sum (which is proportional to the lens power), correcting distortion and coma in the wide-angle mode, and correcting spherical aberration in the telephoto mode would become more difficult. Whenever extremely good optical aberration correction is required, the lower limit of condition (1) preferably should be 0.4 or greater.

The second condition relates to establishing a suitable axial range of motion for zooming lens group G2, and is expressed as:

$$-1.5 \leq X_{2T}/f_W \leq -0.3 \tag{2}$$

wherein $X_{2T}$ is the axial range of motion (i.e., "zooming range") of lens group G2 from the extreme wide-angle mode to the extreme telephoto mode when the object is at "infinity". ($X_{2T}$ is negative when lens group G2 is moved objectwise from the WAM to the TM.) Maintaining the value of condition (2) between the upper and lower limits greatly contributes to achieving a compact design of the lens.

If $X_{2T}/f_W$ were to exceed the upper limit of condition (2), then $|X_{2T}|$ would be unacceptably low. I.e., in order to maintain a suitably high zoom ratio, the air space between lens group G2 and lens group G3 would have to be excessively increased, which undesirably would necessitate an increase in overall length and clear aperture of the lens. If maximal compactness of the lens is desired, then the upper limit on condition (2) preferably should be −0.35 or less.

If $X_{2T}/f_W$ were to be below the lower limit of condition (2), then $|X_{2T}|$ would be unacceptably large. This would present a manufacturing problem in that the charge in overall lens length required between the extreme wide-angle mode and the extreme telephoto mode would be so great that achieving a suitable telescoping length for the cam tube used for zooming would be unacceptably difficult. To alleviate this manufacturing difficulty, the lower limit on condition (2) preferably should be −1.3 or greater.

The third condition relates to establishing a suitable balance of refractive power between lens group G3F and lens group G3R, and is expressed as:

$$0.35 \leq f_{G3F}/f_{G3R} \leq 0.8 \tag{3}$$

wherein $f_{G3F}$ is the focal length of lens group G3F and $f_{G3R}$ is the focal length of lens group G3R.

If $f_{G3R}$ were to exceed the upper limit of condition (3), then the focal length $f_{G3R}$ would be nearly equal to the focal length $f_{G3F}$. Consequently, adequately correcting coma, astigmatism, and distortion of the lens over the entire focal-length range of the lens would be unacceptably difficult. In addition, the clear aperture of lens group G3R must increase as its refractive power increases. If a very high degree of aberration correction of the lens is desired, then the upper limit of condition (3) preferably should be 0.7 or less.

If $f_{G3F}/f_{G3R}$ were to be below the lower limit of condition (3), then the focal length $f_{G3F}$ would be markedly shorter (i.e., the refractive power of G3F would become markedly larger) than focal length $f_{G3R}$, with the consequence that adequately correcting spherical aberration of the lens would be difficult. Also, more lens elements would be required to increase the power of lens group G3F, which in turn would make the lens less compact than desired.

If it is desired to have a very high degree of correction of spherical aberration, then the lower limit of condition (3) preferably should be at least 0.4.

The fourth condition relates to the specific surface profile of an aspherical surface (if present) on a lens element in the second lens group G2. The fourth condition is expressed as:

$$0 < |AS_1 - S_1|/f_W \leq 0.1 \tag{4}$$

wherein $|AS_1 - S_1|$ represents a distance, as measured at the edge (i.e., at the extreme perimeter of the effective diameter) of the aspheric lens element in a direction parallel to the optical axis A, between the aspherical surface and its corresponding reference spherical surface. Thus, a "reference spherical surface," as used in this context, is the spherical surface the aspherical surface would otherwise have if each of the aspheric coefficients were zero.

An aspherical surface that satisfies condition (4), which is preferred, is regarded as "weak."

If $|AS_1 - S_1|/f_W$ were to exceed the upper limit of condition (4), then the aspherical surface would be too "strong," making it difficult to maintain fabrication precision of the aspherical surface. If it is acceptable to relax the required fabrication precision of the aspherical surface, then the upper limit on condition (4) preferably should be 0.05 or less.

If $|AS_1 - S_1|/f_W$ were to be below the lower limit of condition (4), then the aspherical surface would be too "weak" and thus lose its effectiveness for correcting aberrations of the lens. If the aspheric lens element is to be maximally exploited for correcting aberrations, then the lower limit on condition (4) preferably should be at least 0.001.

The fifth condition relates to the specific surface profile of an aspherical surface (if present) on a lens element in the third lens group G3. The fifth condition is expressed as:

$$0 < |AS_2 - S_2|/f_W \leq 0.05 \tag{5}$$

wherein the quantity $|AS_2 - S_2|$ represents a distance, as measured at the edge (i.e., at the extreme perimeter of the effective diameter) of the aspheric lens element in a direction parallel to the optical axis A, between the aspherical surface and it corresponding reference spherical surface. Including an aspherical surface in lens group G3 provides an additional degree of freedom with which to correct coma and spherical aberration of the zoom lens. Not providing an aspherical surface in lens group G3 would require adding more spherical lens elements to adequately correct these aberrations. Thus, the aspheric lens element makes the zoom lens more compact and less expensive.

An aspherical surface that satisfies condition (5), which is preferred, is regarded as "weak."

If $|AS_2 - S_2|/f_W$ were to exceed the upper limit of condition (5), then it would be difficult to maintain fabrication precision of the aspherical surface.

If $|AS_2 - S_2|/f_W$ were to be below the lower limit of condition (5), then the aspherical surface would be too "weak," and thus lose its value for adequately correcting optical aberrations. If the aberration-correction benefits of the aspheric lens element are to be maximally exploited, then the lower limit of condition (5) preferably should be at least 0.001.

Figure 2:
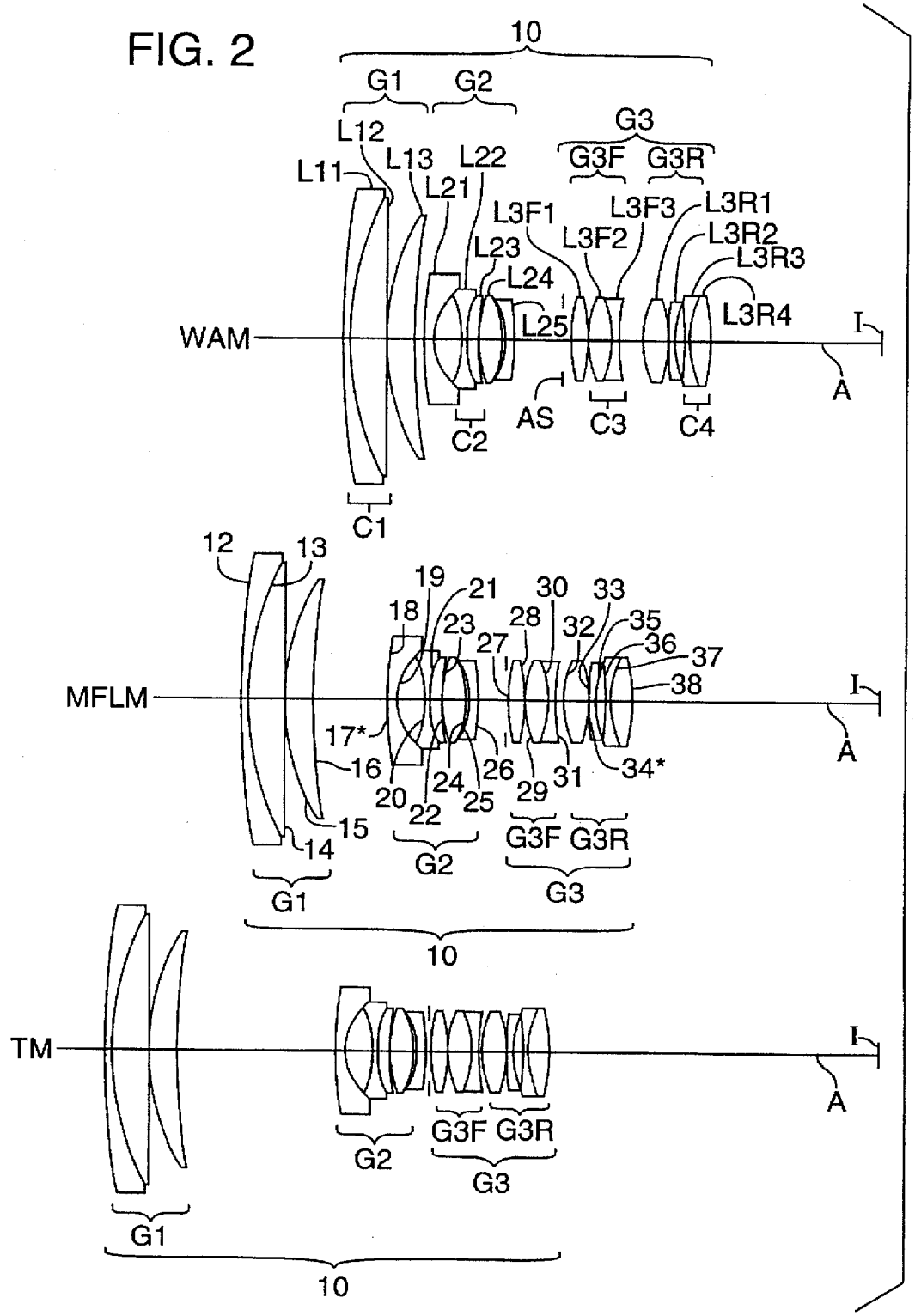
FIG. 2 is an optical diagram of the embodiment of Working Example 1 in the wide-angle, mid-focal length, and telephoto modes.

The sixth condition relates to the refractive power of a negative lens L21 preferably included in he second lens group G2 (see, for example, FIG. 2). The sixth condition is expressed as:

$$0.7 < f_{21}/f_2 \leq 1.6 \tag{6}$$

wherein $f_{21}$ is the focal length of the negative lens L21 (i.e., the most objectwise lens in the lens group G2), and $f_2$ is the focal length of lens group G2. Whenever the negative refractive power of lens L21 is relatively strong, the light rays entering the lens from the extremes of the field of view are more readily refracted in a direction parallel to the optical axis A, thereby allowing the clear aperture of lens group G1 to be reduced. But, a disproportionately strong refractive power of lens L21 relative to the other lens elements in lens group G2 makes it very difficult to correct distortion and lateral aberration.

If $f_{21}/f_2$ were to exceed the upper limit of condition (6), then the refractive power of lens L21 would be so weak that light rays entering the zoom lens from the extremes of the field of view thereof would not reach the image plane unless the diameter of lens group G1 were greatly increased.

If $f_{21}/f_2$ were to be below the lower limit of condition (6), then the refractive power of lens L21 would be disproportionately strong relative to the other lenses in lens group G2 and aberration control would become problematic, as mentioned above.

The seventh condition relates to balancing the difference in refractive indices of the two lens elements of the compound lens in lens group G3R (see, e.g., compound lens C4 in FIG. 2). The seventh condition is expressed as:

$$0.15 \leq n_n - n_p \leq 0.45 \quad (7)$$

wherein $n_n$ is the D-line refractive index of the negative lens element in the compound lens, and $n_p$ is the D-line refractive index of the positive lens element in the compound lens.

Whenever lens group G2 has a relatively strong refractive power, and whenever the overall number of lens elements in the zoom lens is kept to an absolute minimum in order to maintain compactness, the Petzval sum of the zoom lens tends to be negative. Disposing the two-element compound lens in lens group G3R as the most imagewise lens of the lens group (see, e.g., element C4 in FIG. 2) not only compensates for the otherwise negative Petzval sum, but also contributes to a very good correction of coma and lateral aberration of the zoom lens.

If $n_n - n_p$ were to exceed the upper limit of condition (7), then the Petzval sum of the zoom lens would be overcompensated, i.e., the Petzval sum would be large and positive. In addition, exceeding the upper limit of condition (7) would require that the refractive index $n_p$ be too small; consequently, in order to maintain the lens power, the thickness and/or curvature of the positive lens element in the compound lens would have to be increased. This situation would impose unacceptable design and manufacturing problems.

If $n_n - n_p$ were to be below the lower limit of condition (7), then the compound lens in lens group G3R would not adequately compensate for the contribution of lens group G2 to the Petzval sum. As a result, the Petzval sum of the zoom lens would be unacceptably large and negative. If very tight control of the Petzval sum is required, then the lower limit of condition (7) preferably should be 0.2 or greater.

The eighth condition relates to the shape of the most objectwise positive lens in lens group G2 (e.g., lens L24 in FIG. 2a), and is expressed as:

$$-1 < q_{G2} < 1 \quad (8)$$

wherein $q_{G2}$ is a "shape factor," defined as:

$$q_{G2} = (r_{G2R} + r_{G2F})/(r_{G2R} - r_{G2F}) \quad [EQ.1]$$

wherein $r_{G2R}$ and $r_{G2F}$ are the radii of curvature of the imagewise (i.e, "rear") and objectwise (i.e., "front") lens surfaces, respectively, of the subject positive lens. The subscript "G2" in condition (8) denotes the lens group G2. The limits of condition (8) indicate that the preferred shape of the subject positive lens is biconvex. The shape of this positive lens and the shape and refractive power of an air lens formed on the imagewise side thereof (e.g., between L24 and L25 in FIG. 2) play a crucial role in correcting spherical aberration and coma of the zoom lens, particularly in the telephoto mode. It is particularly desirable for the aforementioned air lens to have a meniscus shape with an imagewise convex surface, in order to best correct spherical aberration and coma.

If $q_{G2}$ were to exceed the upper limit of condition (8), then the subject positive lens would have a meniscus shape with an objectwise convex surface. This situation is undesirable because it would result in an axial thickening of the lens group G2, and a corresponding thinner air space between lens groups G2 and G3, which likely would cause these lens groups to interfere mechanically during zooming. To most fully exploit the aberration-control benefits achievable from shaping the subject positive lens in lens group G2, the upper limit on condition (8) preferably should be 0.5 or less.

If $q_{G2}$ were to be below the lower limit of condition (8), then the subject positive lens in lens group G2 would have a meniscus shape with an imagewise convex surface, making it difficult to correct spherical aberration of the zoom lens, particularly in the telephoto mode.

The ninth condition relates to the shape of a positive lens (preferably the most objectwise positive lens) in lens group G3R (e.g., lens element L3R1 in FIG. 2) and is expressed as:

$$-1 < q_{G3R} < 1 \quad (9)$$

wherein $q_{G3R}$ is a shape factor defined as:

$$q_{G3R} = (r_{G3RR} + r_{G3RF})/(r_{G3RR} - r_{G3RF}) \quad [EQ. 2]$$

wherein $r_{G3RR}$ and $r_{G3RF}$ are the radii of curvature of the imagewise and objectwise lens surfaces, respectively, of the subject positive lens in lens group G3R. As in condition (8), the limits on the shape factor $q_{G3R}$ indicate that the subject positive lens in lens group G3R is preferably biconvex.

If $q_{G3R}$ were to exceed the upper limit of condition (9), then the subject positive lens would have a meniscus shape with an objectwise convex surface. This would result in a decreased air space between lens groups G3R and G3F which, in turn, likely would result in a mechanical interference between the two lens groups during zooming.

If $q_{G3R}$ were to be below the lower limit of condition (9), then the subject positive lens would have a meniscus shape with an imagewise convex surface. Such a situation would make it difficult to correct spherical aberrations of the lens.

The tenth condition relates to using lens group G2 for focusing on nearby objects, and is expressed as:

$$-0.9 \leq \beta_{2T} \leq -0.2 \quad (10)$$

wherein $\beta_{2T}$ is the lateral magnification of lens group G2 in the telephoto mode when the object is at infinity. Although focusing on nearby objects also can be done by axially moving lens group G1 toward or away from the object, or by moving lens group G3 toward or away from the object, it is preferable to axially move lens group G2 for focusing (thereby creating an internal focusing system) because the change in aberration of the zoom lens introduced by moving lens group G2 during focusing is relatively small. Also, the axial movement of G2 required for focusing is relatively small.

Whenever lens group G2 is used as the focusing group, the axial range of motion of lens group G2 needed to effectuate a change in focus depends on the magnification of the group.

If $\beta_{2T}$ were to exceed the upper limit of condition (10), then the amount of axial movement of lens group G2 required to change focus by a given amount would be smaller. But, this is undesirable because aberration control of the zoom lens would be unacceptably difficult whenever the power of lens group G2 is too strong.

If $\beta_{2T}$ were to be below the lower limit of condition (10), then the amount of axial movement of lens group G2 required in order to effectuate a change of focus would be excessively large. This would cause an undesirable degradation of close-distance focusing ability of the lens. In addition, the lens barrel would be excessively difficult to design due to the extended range of axial motion thereof required for focusing. To achieve an acceptable range of motion of lens group G2 for the purpose of focusing, the lower limit of condition (10) preferably should be at least −0.7.

Working Examples

The following Working Examples 1 through 5 pertain to representative zoom lens embodiments according to the present invention. The embodiment of each example comprises, in sequence coaxially objectwise to imagewise, the following components (see FIG. 1): a first lens group G1 having a positive overall refracting power, a second lens group G2 having a negative overall refracting power, an aperture stop AS, and a third lens group G3 having a positive overall refracting power. The third lens group comprises a front (i.e., objectwise) lens group G3F with positive overall refracting power, and a rear (i.e., imagewise) lens group G3R having a positive overall refracting power. Zooming the lens from a wide-angle mode to a telephoto mode is accomplished by axially moving lens group G1 linearly objectwise while also moving lens groups G2, G3R, and G3F nonlinearly objectwise. In all the Working Examples below, the aperture stop AS, interposed coaxially between lens groups G2 and G3F, is configured so that it moves together with lens group G3F during zooming.

Each Working Example is set forth in detail in Tables 1 through 15, wherein the following variables, in addition to those defined in conditions (1) through (10), are used:

f=overall focal length of the zoom lens;

F/#=F-number of the zoom lens;

$2\omega$=the field angle;

S=surface number, numbered from objectwise to imagewise.

r=radius of curvature, in millimeters;

d=the axial distance between each adjacent surface, in millimeters;

n=refractive index at the D-line ($\lambda$=587.6 nanometers).

$V_d$ =the Abbe number;

$\beta$=the magnification of the zoom lens;

DO=distance from most objectwise lens surface of the zoom lens to the object;

$B_f$=back focus;

$\phi_1$=clear aperture of the first aspherical surface (i.e., the aspherical surface in lens group 2);

$\phi_2$=clear aperture of the second aspherical surface (i.e., the aspherical surface in lens group 3);

In Tables 1, 4, 7, 10, and 13, an aspherical surface is indicated by a "*" placed next to the surface number, and the radius of curvature given in each table for an aspherical surface is the radius of the reference spherical surface. The shape of an aspherical surface is defined according to the following expression:

$$X(y) = \{(y^2/r)/[1+(1-ky^2)^{1/2}]\} + C_2y^2 + C_4y^4 + C_6y^6 + C_8y^8 + C_{10}y^{10}  \quad [EQ.3]$$

wherein y is the height of the lens surface as measured in a direction perpendicular to the optical axis A, r is the radius of curvature of the reference sphere, k is the conic coefficient, and $C_n$ is the nth order aspheric coefficient. The function X(y) of Eq. 3 describes the axial distance of any point on the aspheric surface relative to a reference spherical surface centered on the optical axis A and touching the apex of the aspheric surface.

FIGS. 3A–3C, 5A–5C, 7A–7C, 9A–9C, and 11A–11C are aberration plots for working examples 1, 2, 3, 4 and 5, respectively.

FIGS. 3A, 5A, 7A, 9A, and 11A are aberration plots for the wide-angle mode, FIGS. 3B, 5B, 7B, 9B, and 11B are aberration plots for the mid-focal length mode, and FIGS. 3C, 5C, 7C, 9C, and 11C are aberration plots for the telephoto mode of the corresponding embodiments.

FIGS. 3A(I), 3B(I), 3C(I), 5A(I), 5B(I), 5C(I) 7A(I), 7B(I), 7C(I), 9A(I), 9B(I), 9C(I), 11A(I), 11B(I), and 11C(I) are spherical aberration plots of the corresponding embodiments, in which "d" denotes the D-line wavelength and "g" denotes the G-line wavelength ($\lambda$=435.8 nanometers). In each plot, the dotted line represents the sine condition.

FIGS. 3A(II), 3B(II), 3C(II), 5A(II), 5B(II), 5C(II), 7A(II), 7B(II), 7C(II), 9A(II), 9B(II), 9C(II), 11A(II), 11B (II), and 11C(II) are aberration plots for astigmatism, wherein the dotted line represents the meridional image surface and the solid line represents the sagittal image surface. The labels "d" and "g" denote the D-line and G-line wavelengths, respectively. "Y" denotes the image height.

FIGS. 3A(III), 3B(III), 3C(III), 5A(III), 5B(III), 5C(III), 7A(III), 7B(III), 7C(III), 9A(III), 9B(III), 9C(III), 11A(III), 11B(III), and 11C(III) are aberration plots for distortion. "Y" denotes the image height.

FIGS. 3A(IV), 3B(IV), 3C(IV), 5A(IV), 5B(IV), 5C(IV), 7A(IV), 7B(IV), 7C(IV), 9A(IV), 9B(IV), 9C(IV), 11A(IV), 11B(IV), and 11C(IV) are aberration plots for lateral chromatic aberration. "Y" denotes the image height.

FIGS. 3A (V), 3S (V), 3C (V), 5A (V), 5B (V), 5C (V) 7A(V), 7B(V), 7C(V), 9A(V), 9B(V), 9C(V), 11A(V), 11B (V), and 11C(V) are aberration plots for transverse chromatic aberration.

Working Example 1

FIG. 2 depicts optical diagrams of the embodiment of Working Example 1 in the wide-angle mode (WAM), mid-focal length mode (MFLM), and telephoto mode (TM). Lens group G1 comprises a two-element compound lens C1 comprising a negative meniscus lens element L11 having an objectwise convex surface 12 and a biconvex lens element L12, and a positive meniscus lens element L13 having an objectwise convex surface 15. Lens group G2 comprises a negative meniscus lens element L21 having an aspherical objectwise convex surface 17*. Lens group G2 also comprises a two-element compound lens C2 comprised of a biconcave lens element L22 and a positive meniscus lens L23 having an objectwise convex surface 21, a biconvex lens element L24, and a negative meniscus lens element L25 having an imagewise convex surface 26. Lens group G3F comprises a biconvex lens element L3F1, and a two-element compound lens C3 comprised of a biconvex lens element L3F2 and a biconcave lens element L3F3. Lens group G3R comprises a biconvex lens element L3R1, a negative meniscus lens element L3R2 having an aspherical objectwise concave surface 34*, and a two-element compound lens C4 comprised of a biconcave lens element L3R3 and a biconvex lens element L3R4.

With respect to this Working Example, the various optical parameters are listed in Tables 1 through 3, below.

TABLE 1 f = 24.7 to 116.5 mm (WAM to TM)
$2\omega$ = 84.2° to 20.3° (WAM to TM)
F/# = 2.6 to 5.9 (WAM to TM)

| Surface | r | d | $V_d$ | n |
|---|---|---|---|---|
| 12 | 176.802 | 1.80 | 23.0 | 1.86074 |
| 13 | 65.950 | 8.30 | 53.9 | 1.71300 |
| 14 | 1066.144 | 0.10 | | |
| 15 | 51.972 | 6.10 | 49.5 | 1.77279 |
| 16 | 147.189 | (d16) | | |
| 17* | 245.722 | 0.03 | 56.3 | 1.49521 |
| 18 | 107.000 | 1.77 | 43.4 | 1.84042 |
| 19 | 13.685 | 6.05 | | |
| 20 | −29.385 | 1.60 | 43.4 | 1.84042 |

TABLE 1-continued f = 24.7 to 116.5 mm (WAM to TM)
2ω = 84.2° to 20.3° (WAM to TM)
F/# = 2.6 to 5.9 (WAM to TM)

| Surface | r | d | $V_d$ | n |
|---|---|---|---|---|
| 21 | 26.162 | 2.30 | 31.1 | 1.68893 |
| 22 | 69.447 | 0.10 | | |
| 23 | 32.815 | 5.60 | 27.6 | 1.75520 |
| 24 | −22.698 | 0.80 | | |
| 25 | −18.278 | 1.60 | 49.5 | 1.77279 |
| 26 | −65.050 | (d26) | | |
| AS | 0.000 | 1.00 | | |
| 27 | 37.920 | 3.30 | 64.1 | 1.51680 |
| 28 | −37.920 | 0.20 | | |
| 29 | 21.224 | 5.80 | 64.1 | 1.51680 |
| 30 | −21.224 | 1.80 | 40.9 | 1.79631 |
| 31 | 45.547 | (d31) | | |
| 32 | 29.885 | 5.00 | 50.8 | 1.65844 |
| 33 | −29.885 | 0.10 | | |
| 34* | 62.246 | 1.80 | 45.4 | 1.79668 |
| 35 | 26.783 | 1.80 | | |
| 36 | −83.063 | 1.70 | 37.4 | 1.83400 |
| 37 | 19.258 | 5.00 | 58.9 | 1.51823 |
| 38 | −39.940 | ($B_f$) | | |

TABLE 2

| Variable | WAM | MFLM | TM |
|---|---|---|---|
| f | 24.7000 | 50.0000 | 116.5000 |
| d16 | 1.9670 | 17.5864 | 36.3302 |
| d26 | 14.0919 | 6.7887 | 0.9512 |
| d31 | 5.7066 | 2.2679 | 0.7991 |
| $B_f$ | 39.3381 | 56.9369 | 76.0792 |
| β | −0.0333 | −0.0333 | −0.0333 |
| DO | 695.1828 | 1406.7640 | 3236.3850 |
| d16 | 1.5018 | 17.1595 | 35.7213 |
| d26 | 14.5571 | 7.2155 | 1.5601 |
| d31 | 5.7066 | 2.2679 | 0.7991 |
| $B_f$ | 39.3381 | 56.9369 | 76.0792 |

The coefficients of the aspherical surfaces are shown below.

(Surface No. 17*)
k=0.0000
$C_2$=0.0000
$C_4$=0.156850×10$^{-4}$
$C_6$=−0.203900×10$^{-7}$
$C_8$=0.261860×10$^{-10}$
$C_{10}$=0.850420×10$^{-13}$ (Surface No. 34*)
k=0.0000
$C_2$=0.0000
$C_4$=−0.343240×10$^{-4}$
$C_6$=−0.740540×10$^{-7}$
$C_8$=−0.347150×10$^{-9}$
$C_{10}$=0.108970×10$^{-11}$

TABLE 3

| Condition | Value |
|---|---|
| (1) | $\|f_2\|/f_w = 0.534$ |
| (2) | $X_{2T}/f_w = -0.757$ |
| (3) | $f_{3F}/f_{3R} = 0.627$ |
| (4) | $\|AS_1 - S_1\|/f_w = 0.01877$ ($\phi_1 = 27.3$) |
| (5) | $\|AS_2 - S_2\|/f_w = 0.00610$ ($\phi_2 = 15.6$) |
| (6) | $f_{21}/f_2 = 1.356$ |
| (7) | $n_n - n_p = 0.316$ |
| (8) | $q_{G2} = q_{L23} = -0.182$ |

TABLE 3-continued

| Condition | Value |
|---|---|
| (9) | $q_{G3R} = q_{L3R1} = 0.0$ |
| (10) | $\beta_{2T} = -0.481$ |

FIGS. 3A(I–V), 3B(I–V), and 3C(I–V) show aberration plots corresponding to wide-angle, mid-focal length, and telephoto modes, respectively, for spherical aberration (3A(I), 3B(I), and 3C(I)), astigmatism (3A(II), 3B(II), and 3C(II)), distortion (3A(III), 3B(III), and 3C(III)), lateral chromatic aberration (3A(IV), 3B(IV), and 3C(IV)), and transverse chromatic aberration (3A(V), 3B(V), and 3C(V)) for this Working Example. As is clear from these plots, the configuration of this Working Example is well-corrected for aberrations over the entire range of focal lengths and is suitable for achieving the objectives of the present invention.

Working Example 2

Figure 4:
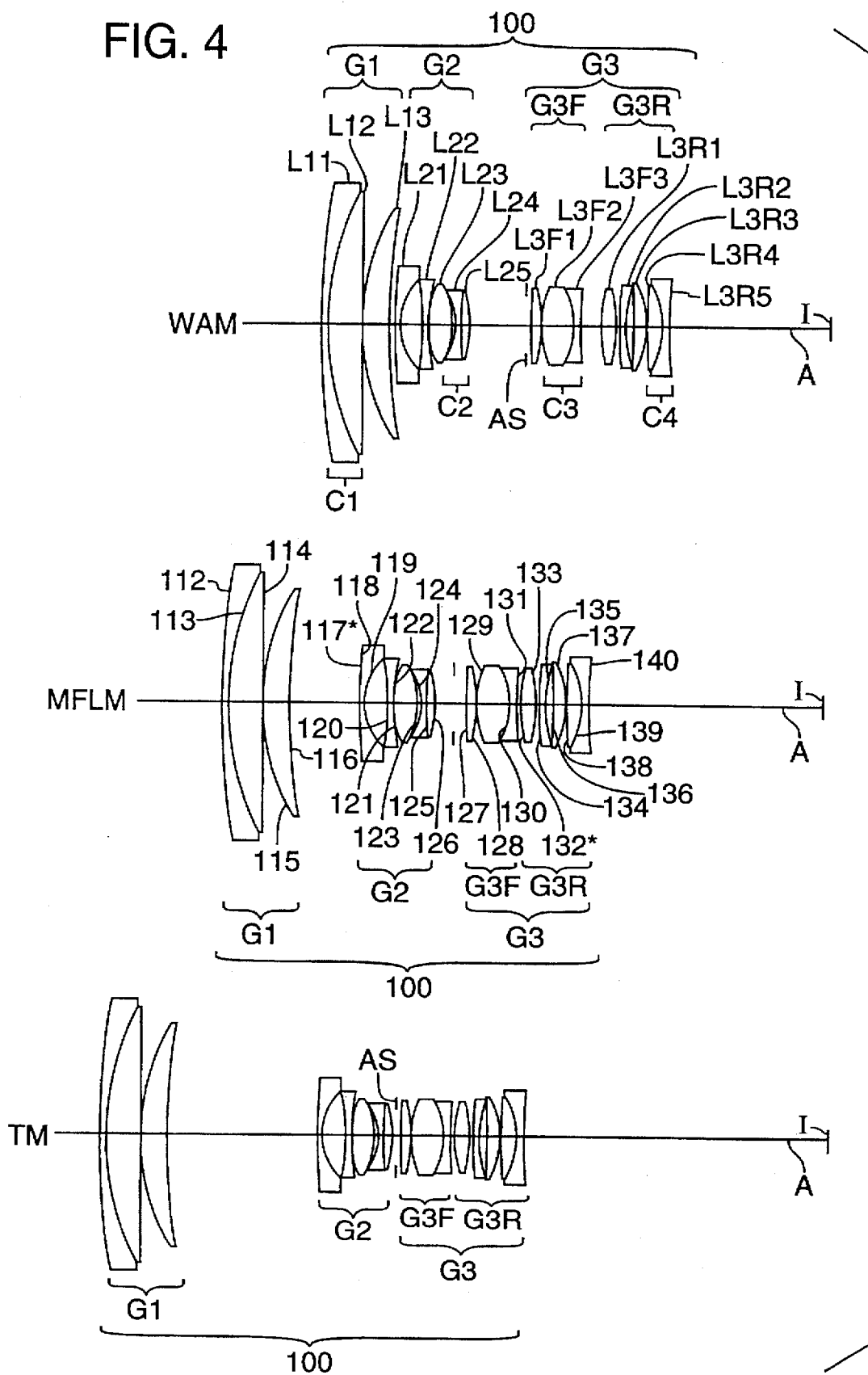
FIG. 4 is an optical diagram of the embodiment of Working Example 2 in the wide-angle, mid-focal length, and telephoto modes.

FIG. 4 depicts optical diagrams of the embodiment 100 of Working Example 2 in the wide-angle mode (WAM), mid-focal length mode (MFLM), and telephoto mode (TM). Lens group G1 comprises a two-element compound lens C1 comprising a negative meniscus lens element L11 having an objectwise convex surface 112 and a biconvex lens element L12, and a positive meniscus lens element L13 having an objectwise convex surface 115. Lens group G2 comprises a negative meniscus lens element L21 having an aspherical objectwise convex surface 117*. Lens group G2 also comprises a biconvex lens element L22, a biconvex lens element L23, and a two-element compound lens C2 comprised of a biconcave lens element L24 and a biconvex lens element L25. Lens group G3F comprises a biconvex lens element L3F1, a two-element compound lens C3 comprised of a biconvex lens element L3F2 and a biconcave lens element L3F3. Lens group G3R comprises a biconvex lens element L3R1 having an aspherical objectwise surface 132*, a negative meniscus lens element L3R2 having an objectwise convex surface 134, a biconvex lens element L3R3, and a two-element compound lens C4 comprised of biconvex lens element L3R4 and a biconcave lens element L3R5.

With respect to this Working Example, the various optical parameters are listed in Tables 4 through 6, below.

TABLE 4 f = 24.7 to 116.5 mm (WAM to TM)

| Surface | r | d | $V_d$ | n |
|---|---|---|---|---|
| 112 | 201.451 | 1.80 | 23.0 | 1.86074 |
| 113 | 70.428 | 8.50 | 53.9 | 1.71300 |
| 114 | −4206.596 | 0.10 | | |
| 115 | 47.275 | 6.10 | 49.5 | 1.77279 |
| 116 | 105.970 | (d116) | | |
| 117* | 128.127 | 0.03 | 56.3 | 1.49521 |
| 118 | 78.000 | 1.60 | 43.4 | 1.84042 |
| 119 | 12.224 | 5.90 | | |
| 120 | −30.076 | 1.40 | 49.5 | 1.77279 |
| 121 | 45.568 | 0.10 | | |
| 122 | 25.882 | 5.00 | 27.6 | 1.75520 |
| 123 | −25.882 | 0.65 | | |
| 124 | −19.169 | 1.70 | 49.5 | 1.77279 |
| 125 | 102.937 | 2.10 | 41.4 | 1.57501 |
| 126 | −46.134 | (d126) | | |
| AS | 0.000 | 1.00 | | |
| 127 | 73.107 | 2.70 | 64.1 | 1.51680 |
| 128 | −38.348 | 0.10 | | |

TABLE 4-continued

| | f = 24.7 to 116.5 mm (WAM to TM) | | | |
|---|---|---|---|---|
| Surface | r | d | $V_d$ | n |
| 129 | 20.934 | 8.00 | 64.1 | 1.51680 |
| 130 | −20.934 | 1.40 | 40.9 | 1.79631 |
| 131 | 78.637 | (d131) | | |
| 132* | 35.000 | 3.20 | 64.1 | 1.51680 |
| 133 | −32.367 | 1.06 | | |
| 134 | 228.546 | 1.40 | 33.9 | 1.80384 |
| 135 | 24.805 | 1.50 | | |
| 136 | 177.789 | 3.30 | 61.0 | 1.58913 |
| 137 | −24.958 | 0.10 | | |
| 138 | 96.599 | 4.30 | 41.4 | 1.57501 |
| 139 | −18.297 | 1.60 | 45.4 | 1.79668 |
| 140 | 95.000 | (B$_f$) | | |

TABLE 5

| Variable | WAM | MFLM | TM |
|---|---|---|---|
| f | 24.7000 | 50.0000 | 116.5000 |
| d116 | 1.8444 | 17.5250 | 36.2092 |
| d126 | 14.1083 | 6.8087 | 0.9666 |
| d131 | 5.5786 | 2.2942 | 0.6708 |
| B$_f$ | 38.9772 | 56.5319 | 75.7197 |
| β | −0.0333 | −0.0333 | −0.0333 |
| DO | 701.2930 | 1412.6696 | 3242.5399 |
| d116 | 1.3792 | 17.0969 | 35.6002 |
| d126 | 14.5735 | 7.2367 | 1.5755 |
| d131 | 5.5786 | 2.2942 | 0.6708 |
| B$_f$ | 38.9772 | 56.5319 | 75.7197 |

The coefficients of the aspherical surfaces are shown below.
(Surface No. 117*)
k=0.0000
$C_2$=0.0000
$C_4$=0.149560×10$^{-4}$
$C_6$=0.309470×10$^{-8}$
$C_8$=−0.199500×10$^{-9}$
$C_{10}$=0.818620×10$^{-12}$
(Surface No. 132)
k=1.0000
$C_2$=0.0000
$C_4$=−0.290460×10$^{-4}$
$C_6$=−0.126360×10$^{-7}$
$C_8$=0.453590×10$^{-9}$
$C_{10}$=−0.277060×10$^{-11}$

TABLE 6

| Condition | Value |
|---|---|
| (1) | If$_2$I/f$_w$ = 0.534 |
| (2) | X$_{ZT}$/f$_w$ = −0.757 |
| (3) | f$_{3F}$/f$_{3R}$ = 0.627 |
| (4) | IAS$_1$ − S$_1$I/f$_w$ = 0.01616 (φ$_1$ = 26.0) |
| (5) | IAS$_2$ − S$_2$I/f$_w$ = 0.00513 (φ$_2$ = 16.3) |
| (6) | f$_{21}$/f$_2$ = 1.263 |
| (7) | n$_n$ − n$_p$ = 0.222 |
| (8) | q$_{G2}$ = q$_{L23}$ = 0.0 |
| (9) | q$_{G3R}$ = q$_{L3R1}$ = −0.039 |
| (10) | β$_{ZT}$ = −0.481 |

FIGS. 5A(I–V), 5B(I–V), and 5C(I–V) show aberration plots corresponding to wide-angle, mid-focal length, and telephoto modes, respectively, for spherical aberration (5A(I), 5B(I), and 5C(I)), astigmatism (5A(II), 5B(II), and 5C(II)), distortion (5A(III), 5B(III), and 5C(III)), lateral chromatic aberration (5A(IV), 5B(IV), and 5C(IV)), and transverse chromatic aberration (5A(V), 5B(V), and 5C(V)) for this Working Example. As is clear from these plots, the configuration of this Working Example is well-corrected for aberrations over the entire range of focal lengths and is suitable for achieving the objectives of the present invention.

Working Example 3

Figure 6:
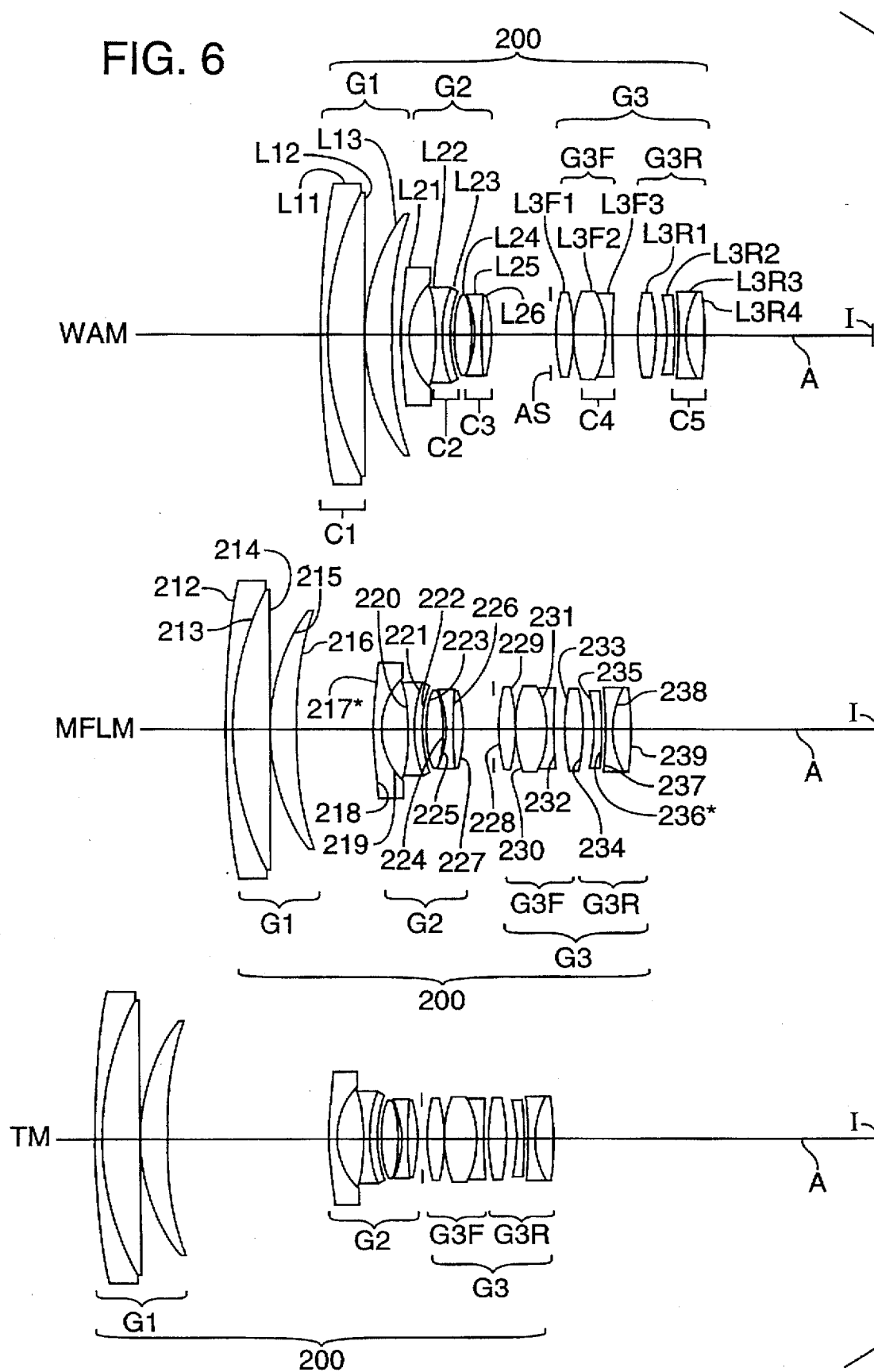
FIG. 6 is an optical diagram of the embodiment of Working Example 3 in the wide-angle, mid-focal length, and telephoto modes.

FIG. 6 depicts optical diagrams of the embodiment 200 of Working Example 3 in the wide-angle mode (WAM), mid-focal length mode (MFLM), and telephoto mode (TM). Lens group G1 comprises a two-element compound lens C1 comprising a negative meniscus lens element L11 having an objectwise convex surface 212 and a biconvex lens element L12, and a positive meniscus lens element L13 having an objectwise convex surface 215. Lens group G2 comprises a negative meniscus lens element L21 having an aspherical objectwise convex surface 217*. Lens group G2 also comprises a two-element compound lens C2 comprised of a biconcave lens element L22 and a positive meniscus lens element L23 having an objectwise convex surface 221, a biconvex lens element L24, and a two-element compound lens C3 comprised of a biconcave lens element L25 and a biconvex lens element L26. Lens group G3F comprises a biconvex lens element L3F1, and a two-element compound lens C4 comprised of a biconvex lens element L3F2 and a biconcave lens element L3F3. Lens group G3R comprises a biconvex lens element L3R1, a negative meniscus lens element L3R2 having an aspherical imagewise convex surface 236*, and a two-element compound lens C5 comprised of a biconcave lens element L3R3 and a biconvex lens element L3R4.

With respect to this Working Example, the various optical parameters are listed in Tables 7 through 9, below.

TABLE 7

| | f = 24.7 to 116.5 mm (WAM to TM) 2ω = 84.2° to 20.6° (WAM to TM) F/# = 3.6 to 5.9 (WAM to TM) | | | |
|---|---|---|---|---|
| Surface | r | d | $V_d$ | n |
| 212 | 223.040 | 1.80 | 23.0 | 1.86074 |
| 213 | 69.586 | 8.80 | 53.9 | 1.71300 |
| 214 | −1213.103 | 0.10 | | |
| 215 | 45.084 | 6.00 | 49.5 | 1.77279 |
| 216 | 94.826 | (d216) | | |
| 217* | 407.879 | 0.03 | 56.3 | 1.49521 |
| 218 | 120.000 | 1.70 | 43.4 | 1.84042 |
| 219 | 13.205 | 6.50 | | |
| 220 | −30.452 | 1.50 | 49.5 | 1.77279 |
| 221 | 39.633 | 2.00 | 45.9 | 1.54814 |
| 222 | 81.330 | 0.10 | | |
| 223 | 32.965 | 4.00 | 27.6 | 1.75520 |
| 224 | −25.467 | 0.70 | | |
| 225 | −19.244 | 1.60 | 49.5 | 1.77279 |
| 226 | 181.542 | 2.30 | 38.0 | 1.60342 |
| 227 | −55.538 | (d227) | | |
| AS | 0.000 | 1.00 | | |
| 228 | 38.141 | 3.50 | 64.1 | 1.51680 |
| 229 | −38.141 | 0.10 | | |
| 230 | 20.914 | 7.90 | 65.8 | 1.46450 |
| 231 | −20.914 | 1.40 | 37.4 | 1.83400 |
| 232 | 68.456 | (d232) | | |
| 233 | 39.380 | 4.50 | 50.8 | 1.65844 |
| 234 | −26.237 | 2.15 | | |
| 235 | −36.815 | 1.80 | 49.5 | 1.74443 |
| 236* | −72.104 | 1.00 | | |
| 237 | −106.517 | 1.50 | 37.4 | 1.83400 |
| 238 | 18.552 | 4.00 | 59.0 | 1.51823 |
| 239 | −76.805 | (Bf) | | |

TABLE 8

| Variable | WAM | MFLM | TM |
|---|---|---|---|
| f | 24.7000 | 50.0000 | 116.5000 |
| d216 | 1.9347 | 17.5556 | 36.2995 |
| d227 | 14.1390 | 6.8349 | 0.9974 |
| d232 | 5.7332 | 2.2941 | 0.8255 |
| $B_f$ | 38.0177 | 55.6177 | 74.7594 |
| β | −0.0333 | −0.0333 | −0.0333 |
| D0 | 695.2617 | 1406.8791 | 3236.4646 |
| d216 | 1.4695 | 17.1288 | 35.6905 |
| d227 | 14.6042 | 7.2618 | 1.6064 |
| d232 | 5.7332 | 2.2941 | 0.8255 |
| $B_f$ | 38.0177 | 55.6177 | 74.7594 |

The coefficients of aspherical surface 217* are shown below.

k=0.0000
$C_2$=0.0000
$C_4$=0.231300×10$^{-4}$
$C_6$=−0.537510×10$^{-7}$
$C_8$=0.135220×10$^{-9}$
$C_{10}$=0.255280×10$^{31\ 13}$

TABLE 9

| Condition | Value |
|---|---|
| (1) | $\|f_2\|/f_w = 0.534$ |
| (2) | $X_{2T}/f_w = -0.757$ |
| (3) | $f_{3F}/f_{3R} = 0.627$ |
| (4) | $\|AS_1 - S_1\|/f_w = 0.02576$ (φ$_1$ = 27.6) |
| (5) | $\|AS_2 - S_2\|/f_w = 0.00714$ (φ$_2$ = 16.4) |
| (6) | $f_{21}/f_2 = 1.277$ |
| (7) | $n_n - n_p = 0.316$ |
| (8) | $q_{G2} = q_{L23} = -0.128$ |
| (9) | $q_{G3R} = q_{L3R1} = -0.200$ |
| (10) | $β_{2T} = -0.481$ |

FIGS. 7A(I–V), 7B(I–V), and 7C(I–V) show aberration plots corresponding to wide-angle, mid-focal length, and telephoto modes, respectively, for spherical aberration (7A(I), 7B(I), and 7C(I)), astigmatism (7A(II), 7B(II), and 7C(II)), distortion (7A(III), 7B(III), and 7C(III)), lateral chromatic aberration (7A(IV), 7B(IV), and 7C(IV)), and transverse chromatic aberration (7A(V), 7B(V), and 7C(V)) for this Working Example. As is clear from these plots, the configuration of this Working Example is well-corrected for aberrations over the entire range of focal lengths and is suitable for achieving the objectives of the present invention.

Working Example 4

FIG. 8 depicts optical diagrams of the embodiment 300 of Working Example 4 in the wide-angle mode (WAM), mid-focal length mode (MFLM), and telephoto mode (TM). Lens group G1 comprises a two-element compound lens C1 comprising a negative meniscus lens element L11 having an objectwise convex surface 312 and a biconvex lens element L12, and a positive meniscus lens element L13 having an objectwise convex surface 315. Lens group G2 comprises a negative meniscus lens element L21 having an aspherical objectwise convex surface 317. Lens group G2 also comprises a biconcave lens element L22, a biconvex lens element L23, and a two-element compound lens C2 comprised of a biconcave lens element L24 and a biconvex lens element L25. Lens group G3F comprises a biconvex lens element L3F1, and a two-element compound lens C3 comprised of a biconvex lens element L3F2 and a biconcave lens element L3F3. Lens group G3R comprises a biconvex lens element L3R1 having an aspherical objectwise surface 332*, a biconcave lens element L3R2, a biconvex lens L3R3, and a two-element compound lens C4 comprised of a biconvex lens element L3R4 and a negative meniscus lens element L3R5 having an imagewise convex surface 340.

With respect to this Working Example, the various optical parameters are listed in Tables 10 through 12, below.

TABLE 10 f = 24.7 to 116.5 mm (WAM to TM)
2ω 84.5° to 20.5° (WAM to TM)
F/# 3.6 to 5.9 (WAM to TM)

| Surface | r | d | $V_d$ | n |
|---|---|---|---|---|
| 312 | 217.916 | 1.50 | 23.0 | 1.86074 |
| 313 | 77.613 | 8.0 | 53.9 | 1.71300 |
| 314 | −1041.802 | 0.10 | | |
| 315 | 46.315 | 6.00 | 53.9 | 1.71300 |
| 316 | 106.108 | (d316) | | |
| 317* | 112.503 | 0.03 | 56.3 | 1.49521 |
| 318 | 70.000 | 1.40 | 46.5 | 1.80411 |
| 319 | 11.758 | 7.00 | | |
| 320 | −23.139 | 1.30 | 46.5 | 1.80411 |
| 321 | 63.322 | 0.10 | | |
| 322 | 28.782 | 5.00 | 25.5 | 1.73038 |
| 323 | −22.417 | 0.50 | | |
| 324 | −17.861 | 1.50 | 43.3 | 1.84042 |
| 325 | 93.309 | 2.50 | 41.4 | 1.57501 |
| 326 | −31.982 | (d326) | | |
| AS | 0.000 | 1.00 | | |
| 327 | 30.694 | 4.70 | 64.1 | 1.51680 |
| 328 | −37.178 | 0.10 | | |
| 329 | 30.260 | 6.40 | 64.1 | 1.51680 |
| 330 | −20.014 | 1.40 | 39.8 | 1.86994 |
| 331 | 105.449 | (d331) | | |
| 332* | 24.363 | 4.50 | 64.1 | 1.51680 |
| 333 | −33.591 | 3.80 | | |
| 334 | −87.657 | 1.40 | 33.9 | 1.80384 |
| 335 | 22.363 | 2.00 | | |
| 336 | 63.940 | 3.50 | 61.0 | 1.58913 |
| 337 | −37.274 | 0.10 | | |
| 338 | 140.493 | 5.50 | 35.5 | 1.59507 |
| 339 | −14.579 | 1.40 | 43.4 | 1.84042 |
| 340 | −95.491 | ($B_f$) | | |

TABLE 11

| Variable | WAM | MFLM | TM |
|---|---|---|---|
| f | 24.7000 | 50.0000 | 116.5000 |
| d316 | 1.8177 | 17.5804 | 36.8507 |
| d326 | 13.0731 | 6.6648 | 1.7264 |
| d331 | 5.9784 | 2.1102 | 0.5009 |
| $B_f$ | 38.0114 | 57.8073 | 79.0182 |
| β | −0.0333 | −0.0333 | −0.0333 |
| D0 | 704.7144 | 1419.5050 | 3265.5086 |
| d316 | 1.4506 | 17.2486 | 36.3906 |
| d326 | 13.4402 | 6.9966 | 2.1864 |
| d331 | 5.9784 | 2.1102 | 0.5009 |
| $B_f$ | 38.0114 | 57.8073 | 79.0182 |

The coefficients of the aspherical surfaces are shown below.
(Surface No. 317*)
k=0.0000
$C_2$=0.0000
$C_4$=0.168112×10$^{-4}$
$C_6$=0.110499×10$^{-7}$
$C_8$=−0.320125×10$^{-9}$
$C_{10}$=0.110101×10$^{-11}$
(Surface No. 332*)
k=1.0000
$C_2$=0.0000

$C_4 = -0.161218 \times 10^{-4}$
$C_6 = -0.578452 \times 10^{-8}$
$C_8 = -0.295968 \times 10^{-10}$
$C_{10} = 0.649515 \times 10^{-13}$

TABLE 12

| Condition | Value |
| --- | --- |
| (1) | $f_2/f_w = 0.486$ |
| (2) | $X_{ZT}/f_w = -0.979$ |
| (3) | $f_{3F}/f_{3R} = 0.637$ |
| (4) | $|AS_1 - S_1|/f_w = 0.01874$ ($\phi_1 = 26.6$) |
| (5) | $|AS_2 - S_2|/f_w = 0.00462$ ($\phi_2 = 18.0$) |
| (6) | $f_{21}/f_2 = 1.41$ |
| (7) | $n_n - n_p = 0.245$ |
| (8) | $q_{G2} = q_{L23} = -0.124$ |
| (9) | $q_{G3R} = q_{L3R1} = 0.159$ |
| (10) | $\beta_{ZT} = -0.429$ |

FIGS. 9A(I–V), 9B(I–V), and 9C(I–V) show aberration plots corresponding to wide-angle, mid-focal length, and telephoto modes, respectively, for spherical aberration (9A (I), 9B(I), and 9C(I)), astigmatism (9A(II), 9B(II), and 9C(II)), distortion (9A(III), 9B(III), and 9C(III)), lateral chromatic aberration (9A(IV), 9B(IV), and 9C(IV)), and transverse chromatic aberration (9A(V), 9B(V), and 9C(V)) for this Working Example. As is clear from these plots, the configuration of this Working Example is well-corrected for aberrations over the entire range of focal lengths and is suitable for achieving the objectives of the present invention.

Working Example 5

Figure 10:
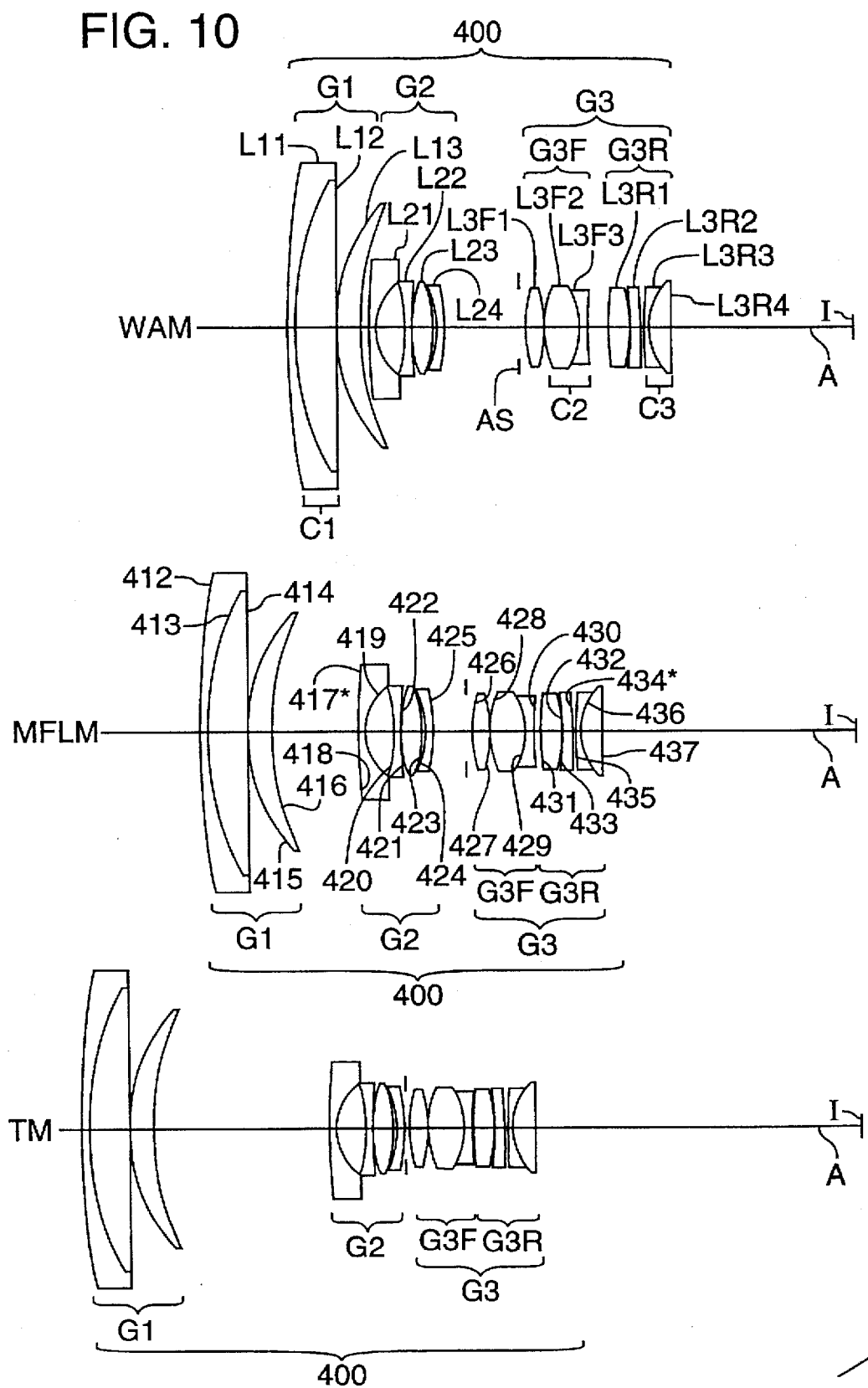
FIG. 10 is an optical diagram of the embodiment of Working Example 5 in the wide-angle, mid-focal length, and telephoto modes.

FIG. 10 depicts optical diagrams of the embodiment 400 of Working Example 5 in the wide-angle mode (WAM), mid-focal length mode (MFLM), and telephoto mode (TM). Lens group G1 comprises a two-element compound lens C1 comprising a negative meniscus lens element L11 having an objectwise convex surface 412 and a biconvex lens element L12, and a positive meniscus lens element L13 having an objectwise convex surface 415. Lens group G2 comprises a negative meniscus lens element L21 having an aspherical objectwise convex surface 417*. Lens group G2 also comprises a biconcave lens element L22, a biconvex lens element L23, and a negative meniscus lens element L24 having an imagewise convex surface 425. Lens group G3F comprises a biconvex lens element L3F1, and a two-element compound lens C2 comprised of a biconvex lens element L3F2 and a biconcave lens element L3F3. Lens group G3R comprises a biconvex lens element L3R1, a negative meniscus lens element L3R2 having an aspherical imagewise convex surface 434*, and a two-element compound lens C3 comprised of a negative meniscus lens element L3R3 having an objectwise convex surface 435, and a positive meniscus lens element L3R4 having an objectwise convex surface 436.

With respect to this Working Example, the various optical parameters are listed in Tables 13 through 15, below.

TABLE 13 f = 24.7 to 116.5 mm (WAM to TM)
2ω = 84.2° to 20.6° (WAM to TM)
F/# = 3.9 to 5.9 (WAM to TM)

| Surface | r | d | $V_d$ | n |
| --- | --- | --- | --- | --- |
| 412 | 154.342 | 1.80 | 23.0 | 1.86074 |
| 413 | 65.931 | 8.80 | 53.9 | 1.71300 |

TABLE 13-continued f = 24.7 to 116.5 mm (WAM to TM)
2ω = 84.2° to 20.6° (WAM to TM)
F/# = 3.9 to 5.9 (WAM to TM)

| Surface | r | d | $V_d$ | n |
| --- | --- | --- | --- | --- |
| 414 | −663.403 | 0.10 | | |
| 415 | 38.438 | 5.00 | 53.9 | 1.71300 |
| 416 | 59.926 | (d416) | | |
| 417* | 1041.942 | 0.03 | 56.3 | 1.49521 |
| 418 | 150.000 | 1.70 | 46.5 | 1.80411 |
| 419 | 12.402 | 6.00 | | |
| 420 | −33.720 | 1.50 | 52.3 | 1.74810 |
| 421 | 48.212 | 0.10 | | |
| 422 | 27.911 | 4.00 | 27.6 | 1.75520 |
| 423 | −32.943 | 0.70 | | |
| 424 | −21.748 | 1.60 | 49.5 | 1.77279 |
| 425 | −44.452 | (d425) | | |
| AS | 0.000 | 1.00 | | |
| 426 | 36.741 | 3.50 | 64.1 | 1.51680 |
| 427 | −52.099 | 0.10 | | |
| 428 | 24.164 | 7.90 | 64.1 | 1.51680 |
| 429 | −21.342 | 1.40 | 37.4 | 1.83400 |
| 430 | 105.334 | (d430) | | |
| 431 | 92.064 | 4.50 | 51.1 | 1.73350 |
| 432 | −27.365 | 0.25 | | |
| 433 | −60.475 | 1.80 | 49.5 | 1.74443 |
| 434* | −264.962 | 1.00 | | |
| 435 | 76.777 | 1.50 | 37.4 | 1.83400 |
| 436 | 16.246 | 4.00 | 58.9 | 1.51823 |
| 437 | 181.459 | ($B_f$) | | |

TABLE 14

| Variable | WAM | MFLM | TYM |
| --- | --- | --- | --- |
| f | 24.7000 | 50.0000 | 116.5000 |
| d416 | 1.7338 | 17.7510 | 36.0578 |
| d425 | 16.9776 | 8.0746 | 0.4899 |
| d430 | 4.6259 | 1.6841 | 0.5012 |
| Bf | 37.9755 | 53.0308 | 68.8547 |
| β | −0.0333 | −0.0333 | −0.0333 |
| DO | 697.0292 | 1399.7932 | 3173.3981 |
| d416 | 1.0873 | 17.1233 | 35.0412 |
| d425 | 17.6241 | 8.7023 | 1.5066 |
| d430 | 4.6259 | 1.6841 | 0.5012 |
| Bf | 37.9755 | 53.0308 | 68.8547 |

The coefficients of the aspherical surfaces are shown below.

(Surface No. 417*)
k=0.0000
$C_2 = 0.0000$
$C_4 = 0.228011 \times 10^{-4}$
$C_6 = 0.630765 \times 10^{-7}$
$C_8 = 0.138790 \times 10^{-9}$
$C_{10} = 0.941031 \times 10^{-13}$ (Surface No. 434*)
k=0.0000
$C_2 = 0.0000$
$C_4 = 0.249873 \times 10^{-4}$
$C_6 = 0.318787 \times 10^{-7}$
$C_8 = 0.817241 \times 10^{-9}$
$C_{10} = -0.670150 \times 10^{-11}$

TABLE 15

| Condition | Value |
| --- | --- |
| (1) | $f_2/f_w = 0.607$ |
| (2) | $X_{ZT}/f_w = -0.416$ |
| (3) | $f_{3F}/f_{3R} = 0.545$ |

TABLE 15-continued

| Condition | Value |
|---|---|
| (4) | $|AS_1 - S_1|/f_w = 0.01956$ ($\phi_1 = 26.6$) |
| (5) | $|AS_2 - S_2|/f_w = 0.00408$ ($\phi_2 = 15.4$) |
| (6) | $f_{21}/f_2 = 1.073$ |
| (7) | $n_n - n_p = 0.316$ |
| (8) | $q_{G2} = q_{L23} = 0.0827$ |
| (9) | $q_{G3R} = q_{L3R1} = -0.542$ |
| (10) | $\beta_{2T} = -0.584$ |

FIGS. 11A(I–V), 11B(I–V), and 11C(I–V) show aberration plots corresponding to wide-angle, mid-focal length, and telephoto modes, respectively, for spherical aberration (11A(I), 11B(I), and 11C(I)), astigmatism (11A(II), 11B(II), and 11C(II)), distortion (11A(III), 11B(III), and 11C(III)), lateral chromatic aberration (11A(IV), 11B(IV), and 11C (IV)), and transverse chromatic aberration (11A(V), 11B(V), and 11C(V)) for this Working Example. As is clear from these plots, the configuration of this Working Example is well-corrected for aberrations over the entire range of focal lengths and is suitable for achieving the objectives of the present invention.

While the present invention has been described in connection with preferred embodiments, it will be understood that it is not limited to those embodiments. On the contrary, it is intended to cover all alternatives, modifications, and equivalents as may be included within the spirit and scope of the invention as defined in the appended claims.

What is claimed is:

1. A zoom lens, comprising objectwise to imagewise on an optical axis:

(a) a first lens group having positive refractive power;

(b) a second lens group having negative refractive power and comprising, objectwise to imagewise, a first negative lens, a second negative lens, a positive lens, and a third negative lens, the first negative lens, the second negative lens, the positive lens, and the third negative lens each having an objectwise air gap and an imagewise air gap with a respective adjacent lens surface;

(c) a third lens group having positive refracting power and comprising, objectwise to imagewise, a front lens group having positive refracting power, and a rear lens group;

(d) the zoom lens having a focal length that is adjustable from a shortest focal length in a wide-angle mode to a longest focal length in a telephoto mode;

(e) the first and second lens groups, when changing the focal length of the zoom lens from the shortest focal length to the longest focal length, being axially movable objectwise, and the front and rear lens groups, when changing the focal length of the zoom lens from the shortest focal length to the longest focal length, being independently axially movable; and (f) the zoom lens satisfying the condition:

$$-1.5 \leq X_{2T}/f_w \leq -0.3$$

wherein $X_{2T}$ is an mount of axial movement undergone by the second lens group when zooming the zoom lens from the shortest focal length to the longest focal length and an object imaged by the zoom lens is disposed at infinity relative to the zoom lens, and $f_w$ is the shortest focal length of the zoom lens.

2. A zoom lens according to claim 1, further satisfying the condition:

$$0.3 \leq |f_2|/f_w \leq 0.8$$

wherein $f_2$ is the focal length of the second lens group.

3. A zoom lens according to claim 1, wherein the rear lens group of the third lens group comprises a compound lens that is the most imagewise lens of the zoom lens, the compound lens including, objectwise to imagewise, a negative lens element, having an index of refraction $n_n$, cemented to a positive lens element having an index of refraction $n_p$, the compound lens satisfying the condition:

$$0.15 \leq n_n - n_p \leq 0.45.$$

4. A zoom lens according to claim 1, wherein the positive lens in the second lens group has an imagewise lens surface having a radius of curvature $r_{G2R}$ and an objectwise lens surface having a radius of curvature $r_{G2F}$, the zoom lens satisfying the condition:

$$-1 < (r_{G2R} + r_{G2F})/(r_{G2R} - r_{G2F}) < 1.$$

5. A zoom lens according to claim 1, wherein the rear lens group of the third lens group comprises a most objectwise positive lens having an imagewise lens surface having radius of curvature $r_{G3RR}$ and an objectwise lens surface having a radius of curvature $r_{G3RF}$, the zoom lens satisfying the condition:

$$-1 < (r_{G3RR} + r_{G3RF})/(r_{G3RR} - r_{G3RF}) < 1.$$

6. A zoom lens according to claim 1, wherein the rear lens group of the third lens group has a positive refracting power.

7. A zoom lens according to claim 1, wherein the third lens group comprises at least one compound lens.

8. A zoom lens according to claim 1, wherein the rear lens group of the third lens group comprises, objectwise to imagewise, a positive lens, a first negative lens, and a second negative lens.

9. A zoom lens according to claim 1, wherein the rear lens group of the third lens group comprises, objectwise to imagewise, a first positive lens, a first negative lens, a second positive lens, and a second negative lens.

10. A zoom lens according to claim 1, wherein the second lens group further comprises an air lens situated between the positive lens and the third negative lens the air lens having a meniscus shape with a convex surface oriented imagewise.

11. A zoom lens for a camera, the zoom lens comprising objectwise to imagewise:

(a) first, second, and third lens groups having positive, negative, and positive refracting power, respectively;

(b) the second lens group comprising, objectwise to imagewise, at least two negative lenses, at least one positive lens, and at least one negative lens, each lens in the second lens group having an objectwise lens surface and an imagewise lens surface, the objectwise and imagewise surfaces of each lens of the second lens group contacting an air gap adjacent the respective lens surface;

(c) the third lens group comprising a front and rear lens groups, the front lens group having a positive refracting power; and (d) the zoom lens being zoomably operable to produce an image over a focal-length range from a wide-angle mode to a telephoto mode such that, whenever the focal length of the lens is being changed from the wide-angle mode to the telephoto mode, the first and second lens groups axially move in an objectwise direction, and the front and rear lens groups of the third lens group each move axially independently so as to satisfy the conditions:

$$0.3 \leq |f_2|/f_W \leq 0.8$$

$$-1.5 \leq X_{2T}/f_W \leq -0.3$$

wherein $X_{2T}$ is the axial distance over which the second lens group is movable when zooming from the shortest focal length to the longest focal length obtainable with the zoom lens when imaging an object placed at infinity relative to the zoom lens, $f_2$ is the focal length of the second lens group, and $f_W$ is the focal length of the zoom lens in the wide-angle mode.

12. A zoom lens, comprising objectwise to imagewise on an optical axis:

(a) a first lens group having positive refractive power;

(b) a second lens group having negative refractive power and comprising, objectwise to imagewise, a first negative lens, a second negative lens, a positive lens, and a third negative lens;

(c) a third lens group having positive refracting power and comprising, objectwise to imagewise, a front lens group having positive refracting power, and a rear lens group;

(d) the zoom lens having a focal length that is adjustable from a shortest focal length in a wide-angle mode to a longest focal length in a telephoto mode;

(e) the first and second lens groups, when changing the focal length of the zoom lens from the shortest focal length to the longest focal length, being axially movable objectwise, and the front and rear lens groups, when changing the focal length of the zoom lens from the shortest focal length to the longest focal length, being independently axially movable; and (f) the zoom lens satisfying the conditions:

$$-1.5 \leq X_{2T}/f_W \leq -0.3,$$

and $$0.35 \leq f_{G3F}/f_{G3R} \leq 0.8$$

wherein $X_{2T}$ is an amount of axial movement undergone by the second lens group when zooming the zoom lens from the shortest focal length to the longest focal length and an object imaged by the zoom lens is disposed at infinity relative to the zoom lens, $f_W$ is the shortest focal length of the zoom lens, $f_{G3F}$ is the focal length of the front lens group of the third lens group, and $f_{G3R}$ is the focal length of the rear lens group of the third lens group.

13. A zoom lens, comprising objectwise to imagewise on an optical axis:

(a) a first lens group having positive refractive power;

(b) a second lens group having negative refractive power and comprising, objectwise to imagewise, a first negative lens, a second negative lens, a positive lens, and a third negative lens, the second lens group including an aspherical surface having a shape characterized by either a negative refractive power that decreases with increasing lateral distance from the optical axis, or a positive refractive power that increases with increasing lateral distance from the optical axis;

(c) a third lens group having positive refracting power and comprising, objectwise to imagewise, a front lens group having positive refracting power, and a rear lens group;

(d) the zoom lens having a focal length that is adjustable from a shortest focal length in a wide-angle mode to a longest focal length in a telephoto mode;

(e) the first and second lens groups, when changing the focal length of the zoom lens from the shortest focal length to the longest focal length, being axially movable objectwise, and the front and rear lens groups, when changing the focal length of the zoom lens from the shortest focal length to the longest focal length, being independently axially movable; and (f) the zoom lens satisfying the condition:

$$-1.5 \leq X_{2T}/f_W \leq -0.3$$

wherein $X_{2T}$ is an mount of axial movement undergone by the second lens group when zooming the zoom lens from the shortest focal length to the longest focal length and an object imaged by the zoom lens is disposed at infinity relative to the zoom lens, and $f_W$ is the shortest focal length of the zoom lens.

14. A zoom lens according to claim 13, wherein the aspherical surface in the second lens group satisfies the condition:

$$0 < (|AS_1 - S_1|)/f_W \leq 0.1$$

wherein $|AS_1 - S_1|$ represents an amount of axial displacement between the aspherical surface and a corresponding reference spherical surface sharing an axial curvature vertex with the aspherical surface, the displacement being at the extreme perimeter of an effective diameter of the aspherical surface.

15. A zoom lens, comprising objectwise to imagewise on an optical axis:

(a) a first lens group having positive refractive power;

(b) a second lens group having negative refractive power and comprising, objectwise to imagewise, a first negative lens, a second negative lens, a positive lens, and a third negative lens;

(c) a third lens group having positive refracting power and comprising, objectwise to imagewise, a front lens group having positive refracting power, and a rear lens group, the third lens group including an aspherical surface having a shape characterized by a negative refractive power that decreases with increasing lateral distance from the optical axis;

(d) the zoom lens having a focal length that is adjustable from a shortest focal length in a wide-angle mode to a longest focal length in a telephoto mode;

(e) the first and second lens groups, when changing the focal length of the zoom lens from the shortest focal length to the longest focal length, being axially movable objectwise, and the front and rear lens groups, when changing the focal length of the zoom lens from the shortest focal length to the longest focal length, being independently axially movable; and (f) the zoom lens satisfying the condition:

$$-1.5 \leq X_{2T}/f_W \leq -0.3$$

wherein $X_{2T}$ is an amount of axial movement undergone by the second lens group when zooming the zoom lens from the shortest focal length to the longest focal length and an object imaged by the zoom lens is disposed at infinity relative to the zoom lens, and $f_W$ is the shortest focal length of the zoom lens.

16. A zoom lens according to claim 15, wherein the aspherical surface in the third lens group satisfies the condition:

$$0 < (|AS_2 - S_2|)/f_W \leq 0.1$$

wherein $|AS_2-S_2|$ represents an amount of axial displacement between the aspherical surface and a corresponding reference spherical surface sharing an axial curvature vertex with the aspherical surface, the displacement being at the extreme perimeter of an effective diameter of the aspherical surface.

17. A zoom lens, comprising objectwise to imagewise on an optical axis:

(a) a first lens group having positive refractive power and a focal length;

(b) a second lens group having a negative refractive power, a focal length $f_2$, and comprising, objectwise to imagewise, a first negative lens having a focal length $f_{21}$, a second negative lens, a positive lens, and a third negative lens;

(c) a third lens group having positive refracting power and comprising, objectwise to imagewise, a front lens group having positive refracting power, and a rear lens group;

(d) the zoom lens having a focal length that is adjustable from a shortest focal length in a wide-angle mode to a longest focal length in a telephoto mode;

(e) the first and second lens groups, when changing the focal length of the zoom lens from the shortest focal length to the longest focal length, being axially movable objectwise, and the front and rear lens groups, when changing the focal length of the zoom lens from the shortest focal length to the longest focal length, being independently axially movable; and (f) the zoom lens satisfying the conditions:

$$-1.5 \leq X_{2T}/f_W \leq -0.3;$$

and $$0.7 \leq f_{21}/f_2 \leq 1.6$$

wherein $X_{2T}$ is an amount of axial movement undergone by the second lens group when zooming the zoom lens from the shortest focal length to the longest focal length and an object imaged by the zoom lens is disposed at infinity relative to the zoom lens, and $f_W$ is the shortest focal length of the zoom lens.

18. A zoom lens, comprising objectwise to imagewise on an optical axis:

(a) a first lens group having positive refractive power;

(b) a second lens group having negative refractive power and comprising, objectwise to imagewise, a first negative lens, a second negative lens, a positive lens, and a third negative lens, the second lens group being axially movable for focusing the zoom lens;

(c) a third lens group having positive refracting power and comprising, objectwise to imagewise, a front lens group having positive refracting power, and a rear lens group;

(d) the zoom lens having a focal length that is adjustable from a shortest focal length in a wide-angle mode to a longest focal length in a telephoto mode;

(e) the first and second lens groups, when changing the focal length of the zoom lens from the shortest focal length to the longest focal length, being axially movable objectwise, and the front and rear lens groups, when changing the focal length of the zoom lens from the shortest focal length to the longest focal length, being independently axially movable; and (f) the zoom lens satisfying the condition:

$$-1.5 \leq X_{2T}/f_W \leq -0.3$$

wherein $X_{2T}$ is an amount of axial movement undergone by the second lens group when zooming the zoom lens from the shortest focal length to the longest focal length and an object imaged by the zoom lens is disposed at infinity relative to the zoom lens, and $f_W$ is the shortest focal length of the zoom lens.

19. A zoom lens according to claim 18, wherein the second lens group satisfies the condition:

$$-0.9 \leq \beta_{2T} \leq -0.2$$

wherein $\beta_{2T}$ represents a lateral magnification of the second lens group at the longest focal length of the zoom lens and an object imaged by the zoom lens is situated at infinity relative to the zoom lens.

20. A zoom lens for a camera, the zoom lens comprising objectwise to imagewise:

(a) first, second, and third lens groups having positive, negative, and positive refracting power, respectively;

(b) the second lens group comprising, objectwise to imagewise, at least two negative lenses, at least one positive lens, and at least one negative lens;

(c) the third lens group comprising a front and rear lens groups, the front lens group having a positive refracting power and a focal length $f_{G3F}$, and the rear lens group having a focal length $f_{G3R}$; and (d) the zoom lens being zoomably operable to produce an image over a focal-length range from a wide-angle mode to a telephoto mode such that, whenever the focal length of the lens is being changed from the wide-angle mode to the telephoto mode, the first and second lens groups axially move in an objectwise direction, and the front and rear lens groups of the third lens group each move axially independently so as to satisfy the conditions:

$$0.3 \leq |f_2|/f_W \leq 0.8$$

$$-1.5 \leq X_{2T}/f_W \leq -0.3$$

$$0.35 f_{G3F}/f_{G3R} \leq 0.8$$

wherein $X_{2T}$ is the axial distance over which the second lens group is movable when zooming from the shortest focal length to the longest focal length obtainable with the zoom lens when imaging an object placed at infinity relative to the zoom lens, $f_2$ is the focal length of the second lens group, and $f_W$ is the focal length of the zoom lens in the wide-angle mode.

21. A zoom lens according to claim 20, characterized by at least one of the following:

(a) the second lens group comprises a lens element having an aspherical optical surface satisfying the condition:

$$0 < (|AS_1-S_1|)/f_W \leq 0.1$$

wherein $|AS_1-S_1|$ represents an amount of axial displacement between the aspherical surface and a corresponding reference spherical surface sharing an axial curvature vertex with the aspherical surface, the displacement being at the extreme perimeter of an effective diameter of the aspherical surface; and (b) the third lens group comprises a lens element having an aspherical optical surface satisfying the condition:

$$0 < (|AS_2-S_2|)/f_W \leq 0.05$$

wherein $|AS_2-S_2|$ represents an amount of axial displacement between the aspherical surface and a corresponding reference spherical surface sharing an axial curvature vertex with the aspherical surface, the displacement being at the extreme perimeter of an effective diameter of the aspherical surface.

22. A zoom lens according to claim 21, further satisfying the condition:

$$0.7 \leq f_{21}/f_2 \leq 1.6$$

wherein $f_{21}$ is the focal length of the first negative lens in the second lens group.

23. A zoom lens according to claim 22, wherein the rear lens group in the third lens group comprises a compound lens including, objectwise to imagewise, a negative lens element having a D-line refractive index $n_n$ cemented to a positive lens element having a D-line refractive index $n_p$, wherein:

$$0.15 \leq n_n - n_p \leq 0.45.$$

24. A zoom lens according to claim 23, wherein the positive lens in the second lens group has an imagewise lens surface having a radius of curvature $r_{G2R}$ and an objectwise lens surface having a radius of curvature $r_{G2F}$, the radii of curvature satisfying the condition:

$$-1 < (r_{G2R} + r_{G2F})/(r_{G2R} - r_{G2F}) < 1.$$

25. A zoom lens according to claim 24, wherein the rear lens group of the third lens group comprises a most objectwise positive lens having an imagewise lens surface having a radius of curvature $r_{G3RR}$ and an objectwise lens surface having a radius of curvature $r_{G3RF}$, the radii of curvature satisfying the condition:

$$-1 < (r_{G3RR} + r_{G3RF})/(r_{G3RR} - r_{G3RF}) < 1.$$

26. A zoom lens according to claim 25, wherein the second lens group has a lateral magnification $\beta_{2T}$ at the longest focal length of the zoom lens whenever the zoom lens is providing an image of an object, situated at infinity relative to the zoom lens, on the image plane, the lateral magnification satisfying the condition:

$$-0.9 \leq \beta_{2T} \leq -0.2.$$

27. A zoom lens for a camera, the zoom lens comprising objectwise to imagewise:
 (a) first, second, and third lens groups having positive, negative, and positive refracting power, respectively;
 (b) the second lens group comprising, objectwise to imagewise, at least two negative lenses, at least one positive lens, and at least one negative lens;
 (c) the third lens group comprising a front and rear lens groups, the front lens group having a positive refracting power;
 (d) the zoom lens being zoomably operable to produce an image over a focal-length range from a wide-angle mode to a telephoto mode such that, whenever the focal length of the lens is being changed from the wide-angle mode to the telephoto mode, the first and second lens groups axially move in an objectwise direction, and the front and rear lens groups of the third lens group each move axially independently so as to satisfy the conditions:

$$0.3 \leq |f_2|/f_W \leq 0.8$$

$$-1.523 X_{2T}/f_W \leq -0.3$$

wherein $X_{2T}$ is the axial distance over which the second lens group is movable when zooming from the shortest focal length to the longest focal length obtainable with the zoom lens when imaging an object placed at infinity relative to the zoom lens, $f_2$ is the focal length of the second lens group, and $f_W$ is the focal length of the zoom lens in the wide-angle mode; and
 (e) the zoom lens exhibiting a zooming ratio, from the shortest to the longest focal length obtainable with the zoom lens, of at least 5-fold.

28. A zoom lens according to claim 27 exhibiting a field angle, at the shortest focal length obtainable with the zoom lens, of at least 80°.

29. A zoom lens according to claim 28, further comprising an aperture stop disposed objectwise of the third lens group.

* * * * *

UNITED STATES PATENT AND TRADEMARK OFFICE
CERTIFICATE OF CORRECTION

PATENT NO. : 5,734,508

DATED : March 31, 1998

INVENTOR(S) : HARUO SATO

It is certified that error appears in the above-identified patent and that said Letters Patent is hereby corrected as shown below:

Column 3, line 49, "$0 < (|AS_1 < S_1|)/f_w \leq 0.1$" should be --$0 < (|AS_1 - S_1|)/f_w \leq 0.1$--.

Column 11, line 11, "charge" should be --change--.

Column 11, line 25, "$f_{G3R}$" should be --$f_{G3F}/f_{G3R}$--.

Column 12, line 7, "0,001" should be --0.001--.

Column 12, line 36, "0,001" should be --0.001--.

Column 12, line 38, "he" should be --the--.

Column 12, line 42, "$0.7 < f_{21}/f_2 \leq 1.6$" should be --$0.7 \leq f_{21}/f_2 \leq 1.6$--.

Column 16, line 19, "liB(IV)" should be --11B(IV)--.

Column 16, line 21, "3S(V)" should be --3B(V)--.

Column 19, line 40, an asterisk --*-- should be added after "Surface No. 132".

UNITED STATES PATENT AND TRADEMARK OFFICE
CERTIFICATE OF CORRECTION

PATENT NO. : 5,734,508
DATED : March 31, 1998
INVENTOR(S) : HARUO SATO

It is certified that error appears in the above-identified patent and that said Letters Patent is hereby corrected as shown below:

Column 21, line 23, "$C_{10} = 0.255280 \times 10^{13\ 31}$" should be
--$C_{10} = -0.255280 \times 10^{-13}$--.

Column 21, line 61, an asterisk --*-- should be added after "surface 317".

Column 24, line 32, "TYM" should be --TM--.

Column 24, line 50, "$C_6 = 0.630765 \times 10^{-7}$" should be --
$C_6 = -0.630765 \times 10^{-7}$--.

Column 24, line 52, "$C_{j0} = 0.941031 \times 10^{-13}$" should be
--$C_{10} = -0.941031 \times 10^{-13}$--.

Column 26, line 22, claim 5, --a-- should be inserted after "having" and before "radius".

Column 32, line 24, claim 27, "$-1.523\ X_{2T}/f_w \leq -0.3$" should be
-- $-1.5 \leq X_{2T}/f_w \leq -0.3$ --.

Signed and Sealed this

Twenty-eighth Day of September, 1999

Attest:

Q. TODD DICKINSON

Attesting Officer

Acting Commissioner of Patents and Trademarks